US012757151B2

(12) United States Patent
Peng et al.

(10) Patent No.: US 12,757,151 B2
(45) Date of Patent: Oct. 6, 2026

(54) MULTIPLE POSITIONING REFERENCE UNIT SIGNAL USAGE

(71) Applicant: QUALCOMM INCORPORATED, San Diego, CA (US)

(72) Inventors: Yuxiang Peng, Sunnyvale, CA (US); Jingchao Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 18/501,899

(22) Filed: Nov. 3, 2023

(65) Prior Publication Data

US 2025/0151006 A1 May 8, 2025

(51) Int. Cl.
*H04W 64/00* (2009.01)
*H04L 5/00* (2006.01)

(52) U.S. Cl.
CPC .......... *H04W 64/00* (2013.01); *H04L 5/0048* (2013.01)

(58) Field of Classification Search
CPC .... H04W 64/00; H04L 5/0048; G01S 19/421; G01S 5/10; G01S 19/07; G01S 5/0236
See application file for complete search history.

(56) References Cited

U.S. PATENT DOCUMENTS 7,852,267 B2 * 12/2010 Duffett-Smith ........ H04B 17/21 342/463
9,612,341 B2 * 4/2017 Large ...................... G01S 19/43

FOREIGN PATENT DOCUMENTS

WO 2022154861 7/2022
WO WO-2022187759 A2 * 9/2022 ............ G01S 19/12

OTHER PUBLICATIONS

International Search Report and Written Opinion—PCT/US2024/049987—ISA/EPO—Feb. 5, 2025.

* cited by examiner

*Primary Examiner* — Kabir A Timory
(74) *Attorney, Agent, or Firm* — Procopio, Cory, Hargreaves & Savitch LLP

(57) ABSTRACT

A UE positioning method includes: receiving, from first and second reference devices, first and second reference device measurements of first and second reference signals from first and second signal sources; receiving, at the UE, the first and second reference signals; determining first and second UE measurements of the first and second reference signals; determining a first position of the UE based on the first UE measurement of the first reference signal and the first reference device measurement of the first reference signal; determining a second position of the UE based on the second UE measurement of the second reference signal and the second reference device measurement of the second reference signal; and determining a third position of the UE based on the first position of the UE and the second position of the UE.

28 Claims, 12 Drawing Sheets

FIG. 10A

1000

| | PRU ID (1010) | RSS ID (1011) | Meaurement (1012) | Measurement uncertainty (1013) | Location (1014) | Speed (1015) | Time (HH:MM:SS:ms) (1016) |
|---|---|---|---|---|---|---|---|
| 1001 | PRU1 | RSS1 | 67m | 2m | Lat1, Long1 | 1.4 m/s | 13:27:31:296 |
| 1002 | PRU1 | RSS2 | 145m | 3m | Lat2, Long2 | 2.2 m/s | 13:27:14:365 |

FIG. 10B

1050

| | PRU ID (1010) | RSS ID (1011) | Meaurement (1012) | Measurement uncertainty (1013) | Location (1014) | Speed (1015) | Time (HH:MM:SS:ms) (1016) |
|---|---|---|---|---|---|---|---|
| 1051 | PRU2 | RSS4 | 129m | 1.1m | Lat4, Long4 | 0 m/s | 13:27:29:873 |
| 1052 | PRU2 | RSS2 | 73m | 1.6m | Lat2, Long2 | 1.1 m/s | 13:27:28:421 |

FIG. 10C

1060

| PRU ID (1010) | RSS ID (1011) | Meaurement (1012) | Measurement uncertainty (1013) | Location (1014) | Speed (1015) | Time (HH:MM:SS:ms) (1016) |
|---|---|---|---|---|---|---|
| PRU1 | RSS1 | 67m | 2m | Lat1, Long1 | 1.4 m/s | 13:27:31:296 |

1001 (row PRU1)

FIG. 10D

1070

| PRU ID (1010) | RSS ID (1011) | Meaurement (1012) | Measurement uncertainty (1013) | Location (1014) | Speed (1015) | Time (HH:MM:SS:ms) (1016) | Weight(s) (1080) |
|---|---|---|---|---|---|---|---|
| PRU1 | RSS1 | 67m | 2m | Lat1, Long1 | 1.4 m/s | 13:27:31:296 | 0.4 |
| PRU2 | RSS4 | 129m | 1.1m | Lat4, Long4 | 0 m/s | 13:27:29:873 | 0.6 |

1071 (row PRU1), 1072 (row PRU2)

MULTIPLE POSITIONING REFERENCE UNIT SIGNAL USAGE

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service (e.g., 5G New Radio (NR)), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. In industrial applications, the location of a mobile device may be necessary for asset tracking, robotic control, and other kinematic operations which may require a precise location of an end effector. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements.

SUMMARY

An example UE (user equipment) includes: at least one memory; at least one receiver; and at least one processor, communicatively coupled to the at least one memory and the at least one receiver, configured to: receive, via the at least one receiver from a first reference device, a first reference device measurement of a first reference signal from a first signal source; receive, via the at least one receiver from a second reference device, a second reference device measurement of a second reference signal from a second signal source, the second reference device being separate from the first reference device; receive, via the at least one receiver, the first reference signal from the first signal source; determine a first UE measurement of the first reference signal; receive, via the at least one receiver, the second reference signal from the second signal source; determine a second UE measurement of the second reference signal; determine a first position of the UE based on the first UE measurement of the first reference signal and the first reference device measurement of the first reference signal; determine a second position of the UE based on the second UE measurement of the second reference signal and the second reference device measurement of the second reference signal; and determine a third position of the UE based on the first position of the UE and the second position of the UE.

An example UE positioning method includes: receiving, at the UE from a first reference device, a first reference device measurement of a first reference signal from a first signal source; receiving, at the UE from a second reference device, a second reference device measurement of a second reference signal from a second signal source, the second reference device being separate from the first reference device; receiving, at the UE, the first reference signal from the first signal source; determining, at the UE, a first UE measurement of the first reference signal; receiving, at the UE, the second reference signal from the second signal source; determining, at the UE, a second UE measurement of the second reference signal; determining, at the UE, a first position of the UE based on the first UE measurement of the first reference signal and the first reference device measurement of the first reference signal; determining, at the UE, a second position of the UE based on the second UE measurement of the second reference signal and the second reference device measurement of the second reference signal; and determining, at the UE, a third position of the UE based on the first position of the UE and the second position of the UE.

Another example UE includes: means for receiving, from a first reference device, a first reference device measurement of a first reference signal from a first signal source; means for receiving, from a second reference device, a second reference device measurement of a second reference signal from a second signal source, the second reference device being separate from the first reference device; means for receiving the first reference signal from the first signal source; means for determining a first UE measurement of the first reference signal; means for receiving the second reference signal from the second signal source; means for determining a second UE measurement of the second reference signal; means for determining a first position of the UE based on the first UE measurement of the first reference signal and the first reference device measurement of the first reference signal; means for determining a second position of the UE based on the second UE measurement of the second reference signal and the second reference device measurement of the second reference signal; and means for determining a third position of the UE based on the first position of the UE and the second position of the UE.

An example non-transitory, processor-readable storage medium includes processor-readable instructions to cause at least one processor of a UE to: receive, from a first reference device, a first reference device measurement of a first reference signal from a first signal source; receive, from a second reference device, a second reference device measurement of a second reference signal from a second signal source, the second reference device being separate from the first reference device; receive the first reference signal from the first signal source; determine a first UE measurement of the first reference signal; receive the second reference signal from the second signal source; determine a second UE measurement of the second reference signal; determine a first position of the UE based on the first UE measurement of the first reference signal and the first reference device measurement of the first reference signal; determine a second position of the UE based on the second UE measurement of the second reference signal and the second reference device measurement of the second reference signal; and determine a third position of the UE based on the first position of the UE and the second position of the UE.

An example apparatus includes: at least one memory; at least one transceiver; and at least one processor, communicatively coupled to the at least one memory and the at least one transceiver, configured to: receive, via the at least one transceiver from a first reference device, a first reference device measurement of a first reference signal from a first signal source; receive, via the at least one transceiver from a second reference device, a second reference device measurement of a second reference signal from a second signal source, the second reference device being separate from the first reference device; evaluate at least one indication of measurement accuracy of the first reference device measurement and the second reference device measurement; and transmit, via the at least one transceiver to a UE based on the at least one indication of measurement accuracy, at least one of the first reference device measurement and the second reference device measurement.

An example reference signal measurement analysis method includes: receiving, at an apparatus from a first reference device, a first reference device measurement of a first reference signal from a first signal source; receiving, at the apparatus from a second reference device, a second reference device measurement of a second reference signal from a second signal source, the second reference device being separate from the first reference device; evaluating, at the apparatus, at least one indication of measurement accuracy of the first reference device measurement and the second reference device measurement; and transmitting, from the apparatus to a UE based on the at least one indication of measurement accuracy, at least one of the first reference device measurement and the second reference device measurement.

Another example apparatus includes: means for receiving, from a first reference device, a first reference device measurement of a first reference signal from a first signal source; means for receiving, from a second reference device, a second reference device measurement of a second reference signal from a second signal source, the second reference device being separate from the first reference device; means for evaluating at least one indication of measurement accuracy of the first reference device measurement and the second reference device measurement; and means for transmitting, to a UE based on the at least one indication of measurement accuracy, at least one of the first reference device measurement and the second reference device measurement.

Another example non-transitory, processor-readable medium includes processor-readable instructions to cause at least one processor of an apparatus to: receive, from a first reference device, a first reference device measurement of a first reference signal from a first signal source; receive, from a second reference device, a second reference device measurement of a second reference signal from a second signal source, the second reference device being separate from the first reference device; evaluate at least one indication of measurement accuracy of the first reference device measurement and the second reference device measurement; and transmit, to a UE based on the at least one indication of measurement accuracy, at least one of the first reference device measurement and the second reference device measurement.

BRIEF DESCRIPTION OF THE DRAWINGS

FIG. 10A is an example of a reference signal measurement report.

FIG. 10B is another example of a reference signal measurement report.

FIG. 10C is another example of a reference signal measurement report.

FIG. 10D is another example of a reference signal measurement report.

DETAILED DESCRIPTION

Figure 1:
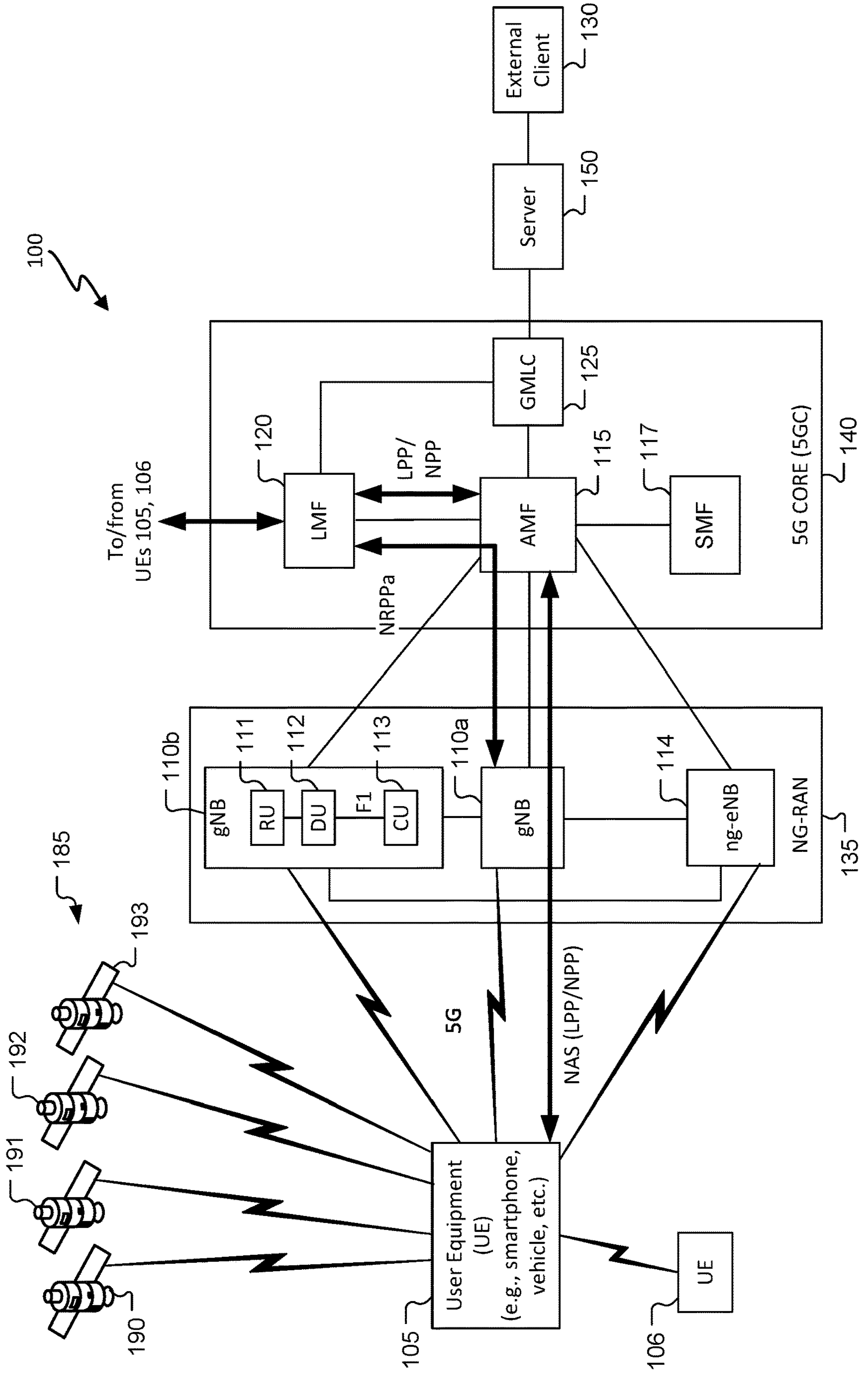
FIG. 1 is a simplified diagram of an example wireless communications system.

Techniques are discussed herein for determining a position of a UE (user equipment) based on measurements made by PRUs (Positioning Reference Units). For example, multiple locations of the UE may be determined based on reference signal measurements from multiple PRUs and measurements by the UE of reference signals from the same signal sources of the reference signals measured by the PRUs. The UE may determine position uncertainties for the positions, and determine a final position as a weighted average of the multiple positions, with weightings of the multiple positions based on the position uncertainties. As another example, multiple reference signal measurements made by PRUs may be evaluated for likely accuracy, and one of the measurements selected (e.g., as being the most likely to be accurate and/or the most accurate), and this measurement used by a UE to determine a location of the UE. As another example, multiple reference signal measurements made by PRUs may be evaluated for likely accuracy, and multiple ones of the measurements selected and weighted (e.g., based on one or more factors indicative of likely accuracy of the corresponding measurements). The weighted measurements may be used to determine a location of the UE. Other configurations, however, may be used.

Items and/or techniques described herein may provide one or more of the following capabilities, as well as other capabilities not mentioned. Positioning accuracy of a target user equipment based on reference signal measurements by multiple PRUs may be improved. For example, reference signal measurements from PRUs with unreliable locations may be ignored or heavily de-weighted. As another example, measurements of reference signals suffering from one or more un-modeled factors (e.g., multipath contamination) may be ignored or heavily de-weighted. Measurement quantities, sampling rates, and/or continuities may be different for different PRUs. Measurement quality may be different for different PRUs. Measurement uncertainty may be used as a criterion for measurement selection to determine position of a target user equipment. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, automobile, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on. Two or more UEs may communicate directly in addition to or instead of passing information to each other through a network.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110*a*, 110*b* and/or the ng-eNB 114 may be configured to communicate with the UE 105 via multiple carriers. Each of the gNBs 110*a*, 110*b* and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such implementations, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some examples, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other examples, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi® APs, an MME, and an E-SMLC.

As noted, in some examples, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the position of the UE.

Figure 2:
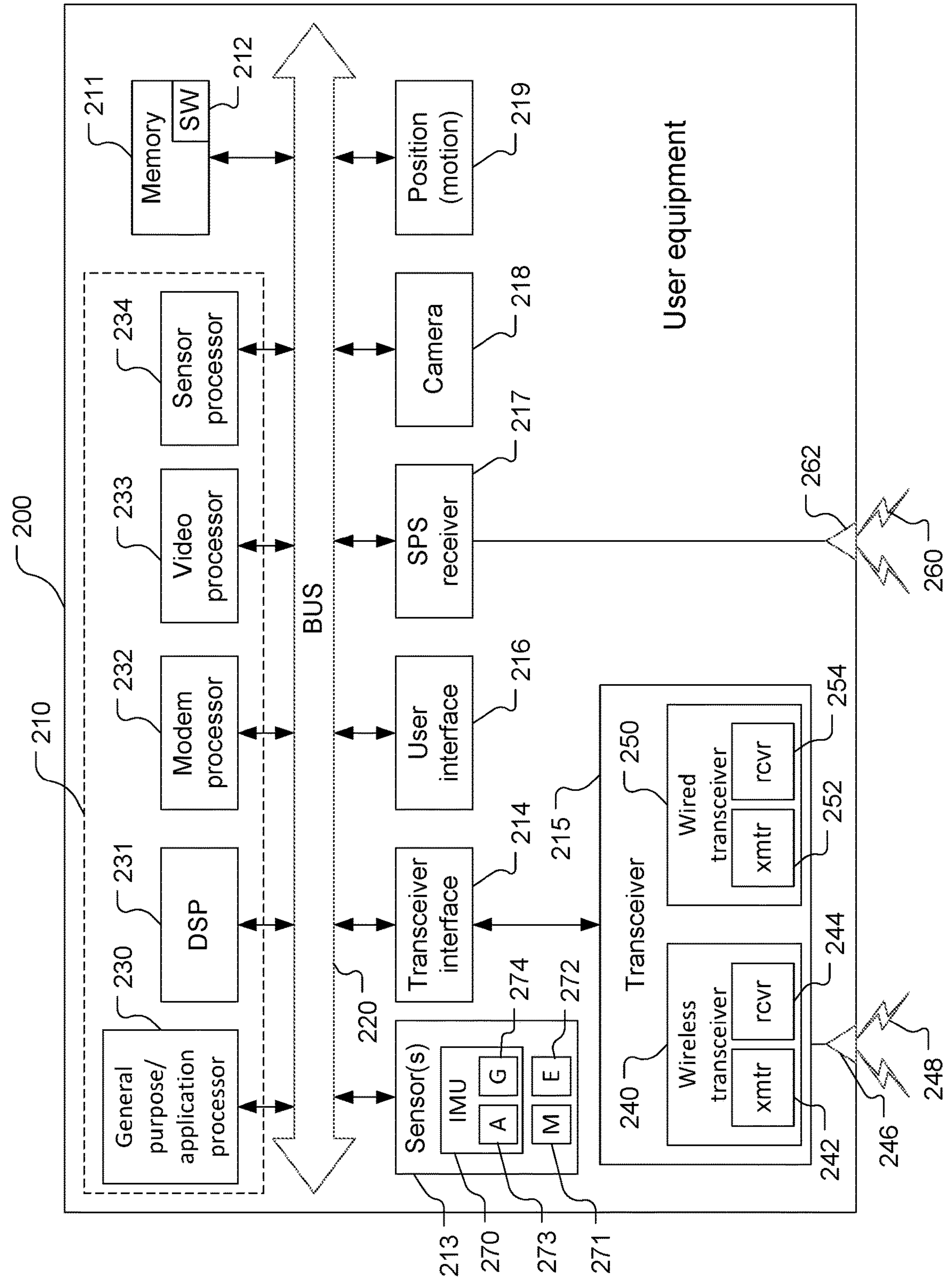
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 200 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer (s) 273 and the gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee®, etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
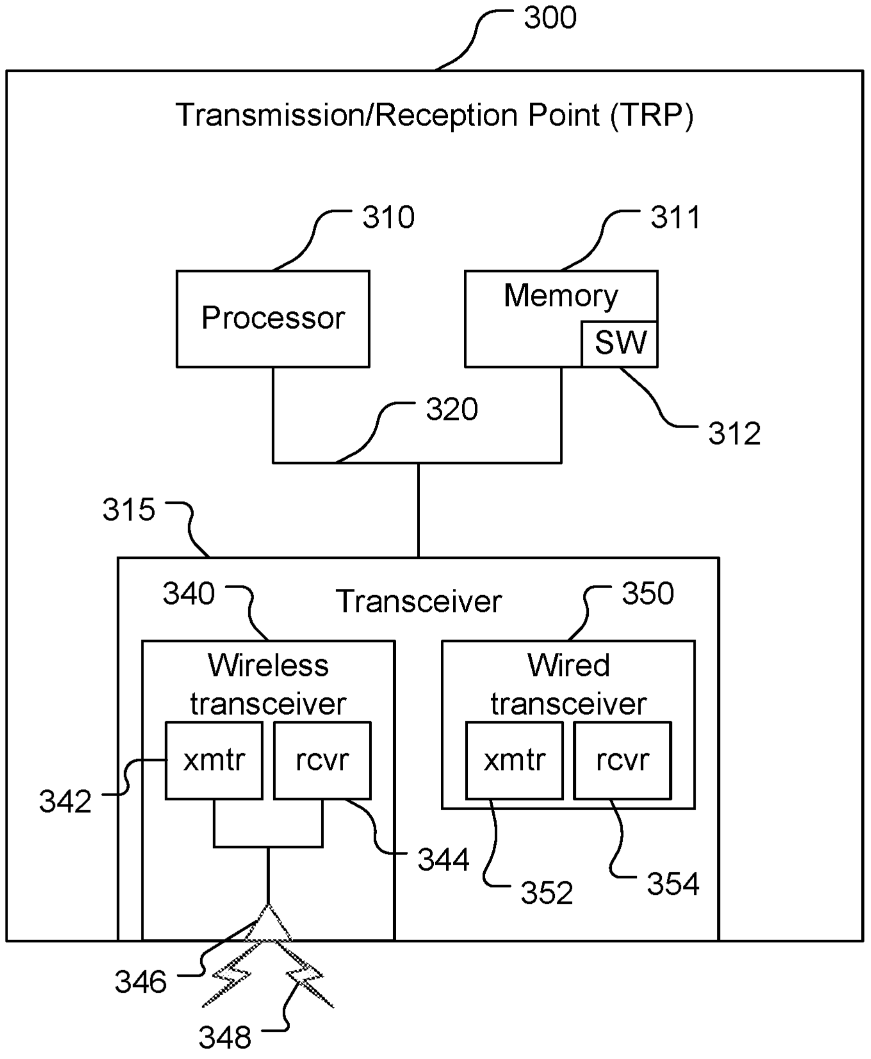
FIG. 3 is a block diagram of components of an example transmission/reception point.

Referring also to FIG. 3, an example of a TRP 300 of the gNBs 110*a*, 110*b* and/or the ng-eNB 114 may comprise a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus may be omitted from the TRP 300. The processor 310 may include one or more hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee®, etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
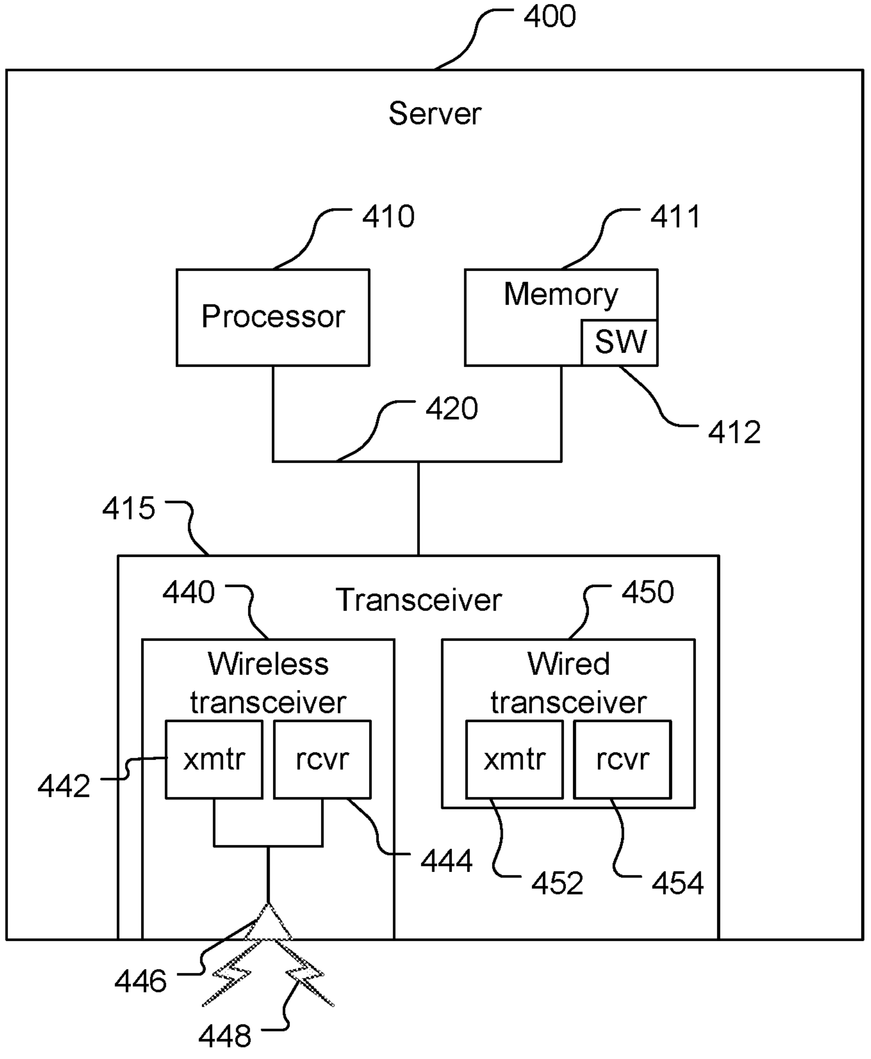
FIG. 4 is a block diagram of components of a server, various examples of which are shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee®, etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, and subtracting the $UE_{Rx\text{-}Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell.

The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence). Position information may include one or more positioning signal measurements (e.g., of one or more satellite signals, of PRS, and/or one or more other signals), and/or one or more values (e.g., one or more ranges (possibly including one or more pseudoranges), and/or one or more position estimates, etc.) based on one or more positioning signal measurements.

Positioning Reference Units for Positioning

A positioning reference unit (PRU) may provide a reference station (e.g., a base station, or a UE) to facilitate differential ranging to determine a position of a target UE. The PRU may be used to measure a positioning signal (e.g., a PRS, an SPS signal, etc.) and this measured signal may be used, e.g., as part of a double-differencing process, to attempt to remove one or more error sources (e.g., geometry inaccuracy, clock drift, clock offset, multipath, atmospheric delay, etc.) from signal measurements, which may improve accuracy of a determined position of the target UE. Multiple PRUs may be used to determine the target UE location, and measurements from different PRUs may be handled in a variety of ways, as discussed herein, to determine the target UE location. A location determined for a PRU may be analyzed for accuracy, and the PRU used for determining the location of a target UE only if the reported location for the PRU is accurate and reliable, e.g., within a threshold accuracy of a surveyed location value. The surveyed location value may be obtained, for example, via one or more precise positioning techniques such as RTK, PPP, and/or PPP-RTK. If a change is made from using a first PRU to a second PRU to determine location of a target UE (even if one or more other PRUs are also used to determine the target UE location), then a positioning drift associated with the change in PRUs may be accounted for in determining the target UE location.

Figure 5:
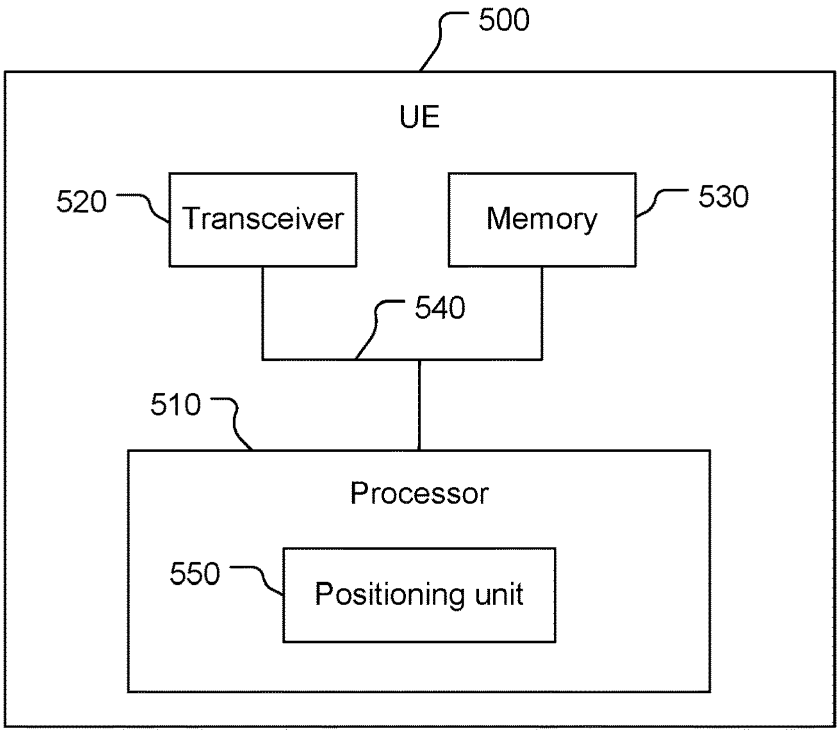
FIG. 5 is a simplified block diagram of an example user equipment.

Referring also to FIG. 5, a UE 500 includes a processor 510, a transceiver 520, and a memory 530 communicatively coupled to each other by a bus 540. Even if referred to in the singular, the processor 510 may include one or more processors, the transceiver 520 may include one or more transceivers (e.g., one or more transmitters and/or one or more receivers), and the memory 530 may include one or more memories. The UE 500 may include the components shown in FIG. 5. The UE 500 may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a positioning unit 550. The positioning unit 550 may be configured to perform positioning operations (e.g., determine position information (e.g., measurements, pseudoranges, position estimates, etc.), aggregate positions (i.e., position estimates) for the UE 500 based on measurements from multiple PRUs, etc.). The positioning unit 550 is discussed further below, and the description may refer to the processor 510 generally, or the UE 500 generally, as performing any of the functions of the positioning unit 550, with the UE 500 being configured to perform the function(s).

Figure 6:
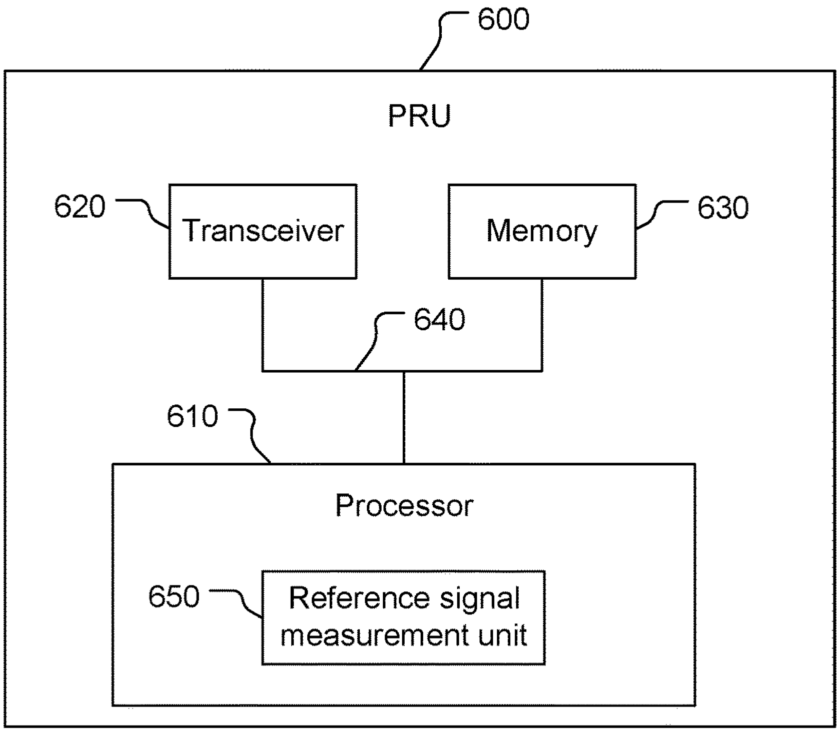
FIG. 6 is a simplified block diagram of an example positioning reference unit.

Referring also to FIG. 6, a PRU 600 includes a processor 610, a transceiver 620, and a memory 630 communicatively coupled to each other by a bus 640. Even if referred to in the singular, the PRU 600 may include one or more measurement analysis apparatus, the processor 610 may include one or more processors, the transceiver 620 may include one or more transceivers (e.g., one or more transmitters and/or one or more receivers), and the memory 630 may include one or more memories. The PRU 600 may include the components shown in FIG. 6 and may be configured to be a component of a communication network (e.g., a terrestrial communication network such as a cellular network). The PRU 600 may include one or more other components such as any of those shown in FIG. 2, FIG. 3, and/or FIG. 4 such that the UE 200, the TRP 300, or the server 400 may be an example of the PRU 600. For example, the processor 610 may include one or more of the components of the processor 210, the processor 310, and/or the processor 410. The transceiver 620 may include one or more of the components of the transceiver 215, the transceiver 315, and/or the transceiver 415. The memory 630 may be configured similarly to the memory 211, the memory 311, and/or memory 411, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the PRU 600 performing a function as shorthand for one or more appropriate components (e.g., the processor 610 and the memory 630) of the PRU 600 performing the function. The processor 610 (possibly in conjunction with the memory 630 and, as appropriate, the transceiver 620) may include a reference signal measurement unit 650. The reference signal measurement 650 may be configured to make reference signal measurements (e.g., measurements of PRS and/or measurements of SPS signals, etc.), and provide one or more reference signal measurements to another device, e.g., a target UE. The reference signal measurement unit 650 is discussed further below, and the description may refer to the processor 610 generally, or the PRU 600 generally, as performing any of the functions of the reference signal measurement unit 650, with the PRU 600 being configured to perform the function(s).

Figure 7:
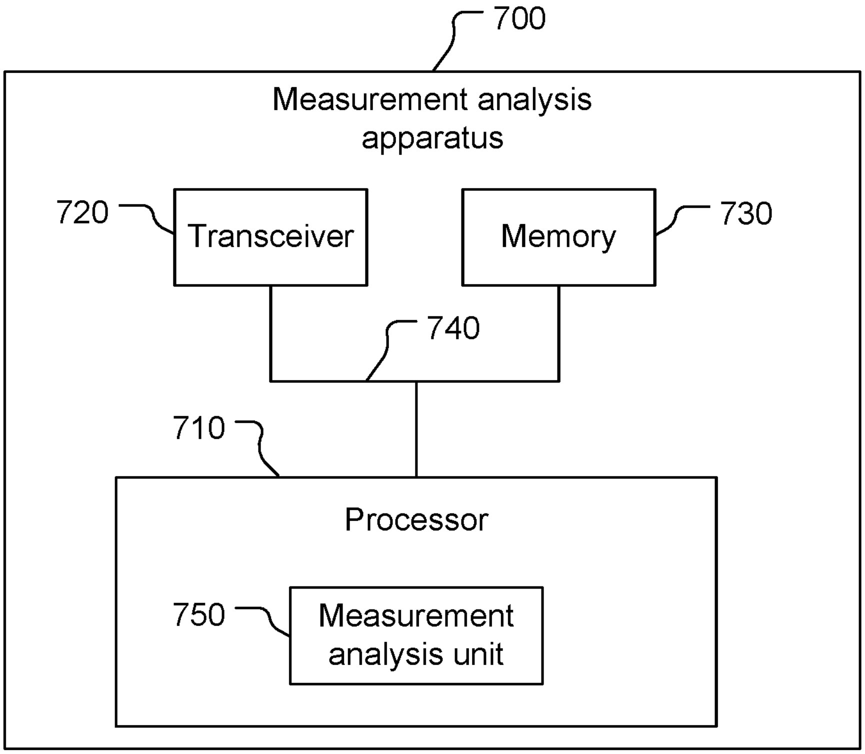
FIG. 7 is a simplified block diagram of an example measurement analysis apparatus.

Referring also to FIG. 7, a measurement analysis apparatus 700 includes a processor 710, a transceiver 720, and a memory 730 communicatively coupled to each other by a bus 740. Even if referred to in the singular, the measurement analysis apparatus 700 may include one or more measurement analysis apparatus, the processor 710 may include one or more processors, the transceiver 720 may include one or more transceivers (e.g., one or more transmitters and/or one or more receivers), and the memory 730 may include one or more memories. The measurement analysis apparatus 700 may include the components shown in FIG. 6 and may be configured to be a component of a communication network (e.g., a terrestrial communication network such as a cellular network). The measurement analysis apparatus 700 may include one or more other components such as any of those shown in FIG. 2, FIG. 3, and/or FIG. 4 such that the UE 200, the TRP 300, or the server 400 may be an example of the measurement analysis apparatus 700. For example, the processor 710 may include one or more of the components of the processor 210, the processor 310, and/or the processor 410. The transceiver 720 may include one or more of the components of the transceiver 215, the transceiver 315, and/or the transceiver 415. The memory 730 may be configured similarly to the memory 211, the memory 311, and/or memory 411, e.g., including software with processor-readable instructions configured to cause the processor 710 to perform functions.

The description herein may refer to the processor 710 performing a function, but this includes other implementations such as where the processor 710 executes software (stored in the memory 730) and/or firmware. The description herein may refer to the measurement analysis apparatus 700 performing a function as shorthand for one or more appropriate components (e.g., the processor 710 and the memory 730) of the measurement analysis apparatus 700 performing the function. The processor 710 (possibly in conjunction with the memory 730 and, as appropriate, the transceiver 720) may include a measurement analysis unit 750. The measurement analysis unit 750 may be configured to analyze reference signal measurements (e.g., measurements of PRS and/or measurements of SPS signals, etc.), select a reference signal measurement and/or synthesize reference signal measurements, and provide one or more reference signal measurements to another device, e.g., a target UE. The measurement analysis unit 750 is discussed further below, and the description may refer to the processor 710 generally, or the measurement analysis apparatus 700 generally, as performing any of the functions of the measurement analysis unit 750, with the measurement analysis apparatus 700 being configured to perform the function(s). The measurement analysis apparatus 700, or at least the measurement analysis unit 750, may be implemented by the UE 500, may be implemented by a layer in the UE 500.

Figure 8:
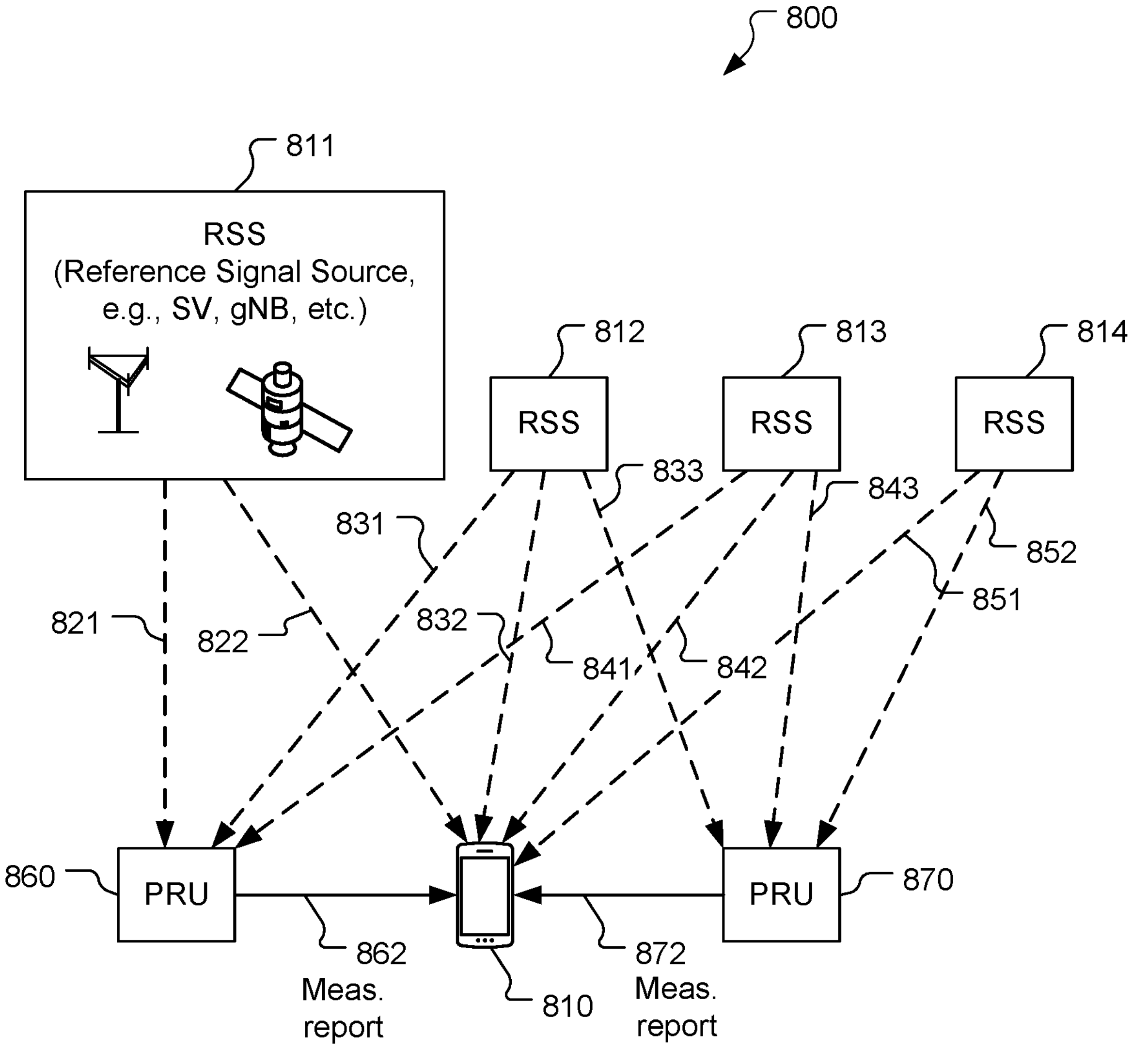
FIG. 8 is a simplified diagram of a positioning environment.

Referring also to FIG. 8, a positioning environment 800 includes a UE 810, RSSes 811, 812, 813, 814 (Reference Signal Sources), and PRUs 860, 870. The UE 810 may be an example of the UE 500. In this example, the UE 810 is a smartphone, but the UE 810 may be any of a variety of other devices (e.g., a tablet computer, etc.).

Each of the PRUs 860, 870 may be an example of the PRU 600. The environment 800 may be used for determining a position of the UE 810 (a target UE). Each of the RSSes 811-814 is configured to transmit one or more reference signals for use in determining the location of the UE 810 (i.e., a target UE location). Each of the RSSes 811-814 may be, for example, a base station or an SV. The RSSes 811-814 are configured to transmit reference signals 821, 822, 831, 832, 833, 841, 842, 843, 851, 852, respectively, each of which may be, for example, a PRS or an SPS signal.

The PRUs 860, 870 are each configured to measure reference signals and transmit respective measurement reports 862, 872 with respective RS measurements to the IE 810. For example, the PRUs 860, 870, e.g., the reference signal measurement unit 650 of each of the PRUs 860, 870, may be configured to measure reference signals. In this example, the PRU 860 may be able to receive and measure the reference signals 821, 831, 841, with the PRU 860 being within range and line of sight of the RSSes 811-813, and the PRU 870 may be able to receive and measure the reference signals 833, 843, 852, with the PRU 870 being within range and line of sight of the RSSes 812-814. The PRUs 860, 870, e.g., the reference signal measurement unit 650 of each of the PRUs 860, 870, may be configured to transmit, via the respective transceivers 620, the measurement reports 862, 872 containing the measurements of the RS 821, 831, 841, and the RS 833, 843, 852, respectively.

The UE 810, e.g., the positioning unit 550, may be configured to receive and measure reference signals. In this example, the UE 810 may be able to receive and measure the reference signals 822, 832, 842, 851, with the UE 810 being within range and line of sight of the RSSes 811-814. The UE 810, e.g., the positioning unit 550, may be configured to use the reference signal measurements in the measurement reports 862, 872 and the measurements of the reference signals 822, 832, 842, 851 to determine two position estimates for the UE 810, thus being about to use reference signal measurements from all of the RSSes 811-814 even if neither of the PRUs 860, 870 provides reference signal measurements from all of the RSSes 811-814.

The UE 810, e.g., the positioning unit 550, may be configured to perform solution aggregation of position estimates determined using reference signal measurements from different PRUs. For example, the UE 810, e.g., the positioning unit 550, may be configured to determine a position estimate for the UE 810 (e.g., using a least squares algorithm or a Kalman Filter) based on reference signal measurements in the measurement report 862 and measurements of reference signals from the same RSSes from which signals were measured and reported in the measurement report 862, here the RSSes 811-813. Similarly, the UE 810, e.g., the positioning unit 550, may be configured to determine another position estimate for the UE 810 based on reference signal measurements in the measurement report 872 and measurements of reference signals from the same RSSes from which signals were measured and reported in the measurement report 872, here the RSSes 812-814. The UE 810, e.g., the positioning unit 550, may be configured to determine a position uncertainty for each of the determined position estimates. The UE 810 may be configured to determine a weighted average estimated position by weighting the two determined position estimates based on the position uncertainties corresponding to the two determined position estimates. For example, the weighted average position estimate may be determined by $$P_{wavg} = \frac{1}{N}\sum_{i=1}^{N}\frac{1}{u_i}P_i \tag{1}$$

where $P_{wavg}$ is the weighted average position of the target UE, e.g., the UE 810, $u_i$ is the position uncertainty determined using reference signal measurements from the $i^{th}$ PRU, $P_i$ is the position estimate using reference signal measurements from the $i^{th}$ PRU, and N is the number of PRUs from each of which reference signal measurements are used to determine a respective position estimate. Thus, for example, if there are two PRUs and the position uncertainty of a first position estimate is twice the uncertainty of a second position estimate, then the weighting of the second position estimate will be twice the weighting of the first position estimate.

Figure 9:
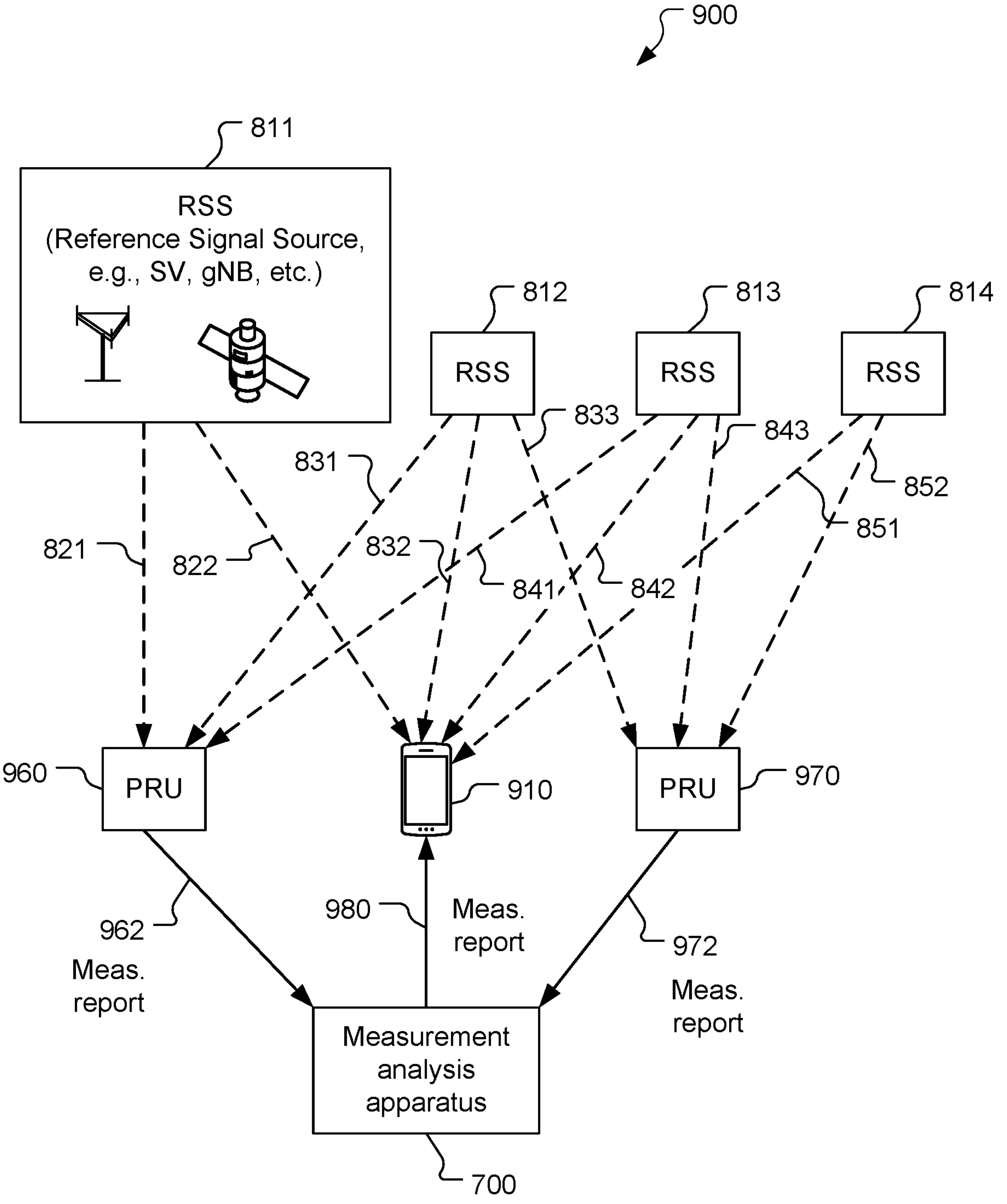
FIG. 9 is a simplified diagram of another positioning environment.

Referring also to FIG. 9, a positioning environment 900 includes a UE 910, the RSSes 811, 812, 813, 814, PRUs 960, 970, and the measurement analysis apparatus 700. The UE 910 may be an example of the UE 500. In this example, the UE 910 is a smartphone, but the UE 910 may be any of a variety of other devices (e.g., a tablet computer, etc.). Each of the PRUs 960, 970 may be an example of the PRU 600. The environment 900 may be used for determining a position of the UE 910 (a target UE).

The PRUs 860, 870 are each configured to measure reference signals and transmit respective measurement reports 962, 972 with respective RS measurements to the measurement analysis apparatus 700. For example, the PRUs 960, 970, e.g., the reference signal measurement unit 650 of each of the PRUs 960, 970, may be configured to measure reference signals. In this example, the PRU 960 may be able to receive and measure the reference signals 821, 831, 841, with the PRU 960 being within range and line of sight of the RSSes 811-813, and the PRU 970 may be able to receive and measure the reference signals 833, 843, 852, with the PRU 970 being within range and line of sight of the RSSes 812-814. The PRUs 960, 970, e.g., the reference signal measurement unit 650 of each of the PRUs 960, 970, may be configured to transmit, via the respective transceivers 620, the measurement reports 962, 972 containing the measurements of the RS 821, 831, 841, and the RS 833, 843, 852, respectively.

Simulations have found that aggregation of position solutions for a target UE may improve positioning accuracy of the target UE. For example, it has been found through simulations that a cumulative distribution function of horizontal position error for an aggregated position solution (using measurements from multiple PRUs) has a lower horizontal positioning error at 50% and 68% than positions determined from PRU measurements from a single PRU.

Referring also to FIGS. 10A and 10B, the measurement reports 962, 972 may each include one or more measurements and may include information that can be used to analyze the measurements and select a measurement, or to weight different measurements. For example, a measurement report 1000 may be an example of the measurement report 962 sent by the PRU 960 and a measurement report 1050 may be an example of the measurement report 962 sent by the PRU 970. In these examples, each of the reports 1000, 1050 includes a PRU ID field 1010, an RSS ID field 1011, a measurement field 1012, a measurement uncertainty field 1013, a location field 1014, a speed field 1015, and a time field 1016. These are examples, and other configurations of measurement reports (e.g., with fewer fields, more fields, and/or different fields) may be used. Also, the reports 1000, 1050 each have a value provided in each of the fields 1010-1016, but one or more fields in a measurement report may be empty. The RSS ID field 1011 indicates the source of a reference signal that is measured by the PRU indicated in the PRU ID field 1010 to obtain the measurement shown in the measurement field 1012. In this example, the report 1000 includes two entries 1001, 1002 with two corresponding range measurements based on signals from RSS1 and RSS2 (e.g., the RSS 811 and the RSS 812), respectively. Also in this example, the report 1050 includes two entries 1051, 1052 with two corresponding range measurements based on signals from RSS4 and RSS2 (e.g., the RSS 814 and the RSS 812), respectively. Other measurement quantities (more or fewer than the two as shown in FIGS. 10A and 10B) may be provided in a measurement report. Also or alternatively, one or more other measurement types (other than range measurements as shown) may be reported. The location field 1014, the speed field 1015, and the time field 1016 indicate a location and speed of the PRU when the measured reference signal was received, and the time that the measured signal was received, respectively.

The measurement analysis apparatus 700, e.g., the measurement analysis unit 750, may be configured to analyze the reports 962, 972 to determine one or more measurements to send to the UE 910 in a measurement report 980. For example, the measurement analysis unit 750 may be configured to select a single common measurement from multiple PRUs based on measurement uncertainty, or to select multiple common measurements from multiple PRUs and weight the common measurements. A common measurement is a measurement made by two (or more) PRUs of one or more reference signals from the same signal source. The different PRUs may measure the identical reference signal or may measure distinct reference signals (although the distinct reference signals may be the same type of reference signal, e.g., transmitted at different times and/or with different frequencies).

The measurement analysis apparatus 700, e.g., the measurement analysis unit 750, may be configured to select one or more common measurements based on measurement uncertainty. For example, the measurement analysis unit 750 may be configured to select the common measurement with the lowest measurement uncertainty, e.g., the measurement in the entry 1051 in the report 1050 because the measurement uncertainty (1.1 m) in the entry 1051 is the lowest measurement uncertainty in the reports 1000, 1050. As another example, the measurement analysis unit 750 may be configured to weight (e.g., using a least squares or inverse weighting) multiple measurements based on measurement uncertainty. For example, the measurement analysis unit 750 may be configured to determine measurement weights according to $$W_j = mu_j / \left(\sum_{i=1}^{N} mu_i\right) \tag{2}$$

where $W_j$ is the weight of the $j^{th}$ measurement, mu; is the measurement uncertainty of the $j^{th}$ measurement, $mu_i$ is the measurement uncertainty of the $i^{th}$ measurement, and N is the number of measurements being weighted.

The measurement analysis apparatus 700, e.g., the measurement analysis unit 750, may be configured to select one or more common measurements based on proximity of the measuring PRU to the UE 910. For example, the measurement analysis unit 750 may be configured to select the common measurement corresponding to the PRU that is closest to the UE 910, based on a coarse location of the UE 910 (e.g., as determined by E-CID). As another example, the measurement analysis unit 750 may be configured to weight multiple measurements based on respective distances of the measuring PRUs from the UE 910 (e.g., similar to Equation (2), but using distance between the measuring PRU and the UE 910 instead of measurement uncertainty). If the UE 910 implements the measurement analysis unit 750, then the UE 910 may select the measurement(s) based on sidelink (SL) signal strength (e.g., of SL signals received from the PRUs 960, 970) or based on SL zone ID. For example, the SL signals measured for signal strength may be the signals containing the measurement reports 962, 972. The UE 910 may use SL zoned IDs corresponding to SL zones (that are geographic regions, e.g., square regions of x meters per side) to determine coarse locations of PRSs/SL anchors. The UE 910 (or other measurement engine) may use the coarse location information to estimate ranges and/or relative directions (AoA/AoD) between the UE 910 and other entities, and use the ranges and/or relative directions to select one or more measurements, e.g., based on expected accuracy/reliability (e.g., due to closeness and/or desired relative direction (e.g., LOS (line of sight) vs. NLOS (non-line of sight)).

The measurement analysis apparatus 700, e.g., the measurement analysis unit 750, may be configured to select one or more common measurements based on mobility of the measuring PRU. For example, the measurement analysis unit 750 may be configured to select the common measurement corresponding to the PRU that is moving the slowest (or at least slower such that measurements from slower moving PRUs are weighted more than measurements from faster moving PRUs). As another example, the measurement analysis unit 750 may be configured to weight multiple measurements based on respective speeds of the measuring PRUs (e.g., similar to Equation (2) but using speed of the measuring PRU and the UE 910 instead of measurement uncertainty). A measurement made by a stationary receiver (e.g., a stationary PRU) is typically more reliable than a measurement made by a receiver that is in motion. In the example of the measurement reports 1000, 1050, the measurement analysis unit 750 may select the measurement from the entry 1051 from the report 1050 (or weight the measurement from the entry 1051 more heavily) because the measurement was made while the PRU 970 was stationary while the measurements for the entries 1001, 1002, 1052 were made while the respective PRU was moving at 1.4 m/s, 2.2 m/s, and 1.1 m/s, respectively.

The measurement analysis apparatus 700, e.g., the measurement analysis unit 750, may be configured to select one or more common measurements based on times of measurement. For example, the measurement analysis unit 750 may be configured to select the common measurement that is closest in time to a reference time, e.g., a time that the common measurement is made by the UE 910, or a present time. As another example, the measurement analysis unit 750 may be configured to weight multiple measurements based on respective measurement times relative to the time measurement by the UE 910 (e.g., similar to Equation (2) but using relative time of measurement instead of measurement uncertainty). A measurement of a signal from a source made by a PRU may be more useful in determining position of the UE 910 accurately the closer in time the measurement is to a measurement made by the UE 910 of a signal from the same source.

The measurement analysis apparatus 700, e.g., the measurement analysis unit 750, may be configured to use a PRU as a benchmark PRU to assess measurement quality from other PRUs, e.g., based on a residual check. This may help avoid determining a position of the UE 910 based on a PRU with an inaccurate location and/or based on PRU measurement(s) with multipath effect contamination. The measurement analysis apparatus 700 may specify a PRU as a benchmark PRU based on the benchmark PRU having a reliable truth position, e.g., based on the location of the benchmark PRU having been verified (e.g., with SPS location). The measurement analysis apparatus 700 may be configured to verify the location of any PRU that joins a network with the measurement analysis apparatus 700, e.g., any PRU that may potentially be used to provide one or more measurements for determining the location of the UE 910. The measurement analysis apparatus 700 may take advantage of the PRU(s) already in the network with a respective converged location (e.g., a converged Kalman Filter). The measurement analysis apparatus 700 may use the PRUs with accurate positions to perform double-difference measurement residual analysis so that any low-quality measurement (e.g., due to multipath effect, abnormal clock drift, etc.) may be detected and removed from consideration to determine the location of the UE 910. The measurement analysis apparatus 700 may determine the accuracy of other PRU locations using the benchmark PRU and ignore, or heavily de-weight measurements from PRUs with poor location accuracy. If the reported location for a PRU is inaccurate, then the measurement analysis apparatus 700 may solve for the location of the PRU and this location may be broadcast as the location of the PRU. Also or alternatively, the measurement analysis apparatus 700 may use the benchmark PRU to determine whether measurements from other PRUs suffer from one or more unmodeled factors (e.g., multipath contamination) and ignore, or heavily de-weight measurements with one or more unmodeled factors.

The measurement analysis apparatus 700 may be configured to perform a combination of two or more of the techniques discussed above to select one or more measurements. For example, each PRU may be pre-screened based on a residual check before any measurement from a PRU will be considered. Having been pre-screened, the measurement(s) may be selected based on one or more of measurement uncertainty, PRU spatial proximity to the UE 910, PRU motion, and/or PRU measurement temporal proximity to UE measurement. For example, an overall weight of a measurement may be a combination of individual-factor weights (e.g., a weight based on PRU speed may be weighted more heavily than a weight based temporal measurement proximity to determine an overall weight for a measurement). Selection of one or more measurements, and weighting multiple measurements, may help ensure use of measurement accuracy and/or favoring of accurate/relevant measurements, which may improve the accuracy of a determined position of a target UE.

Also or alternatively, the measurement analysis apparatus 700 may be configured to impose one or more thresholds for one or more corresponding factors. For example, for the measurement analysis apparatus 700 to consider a measurement from a PRU, the measurement analysis apparatus 700 may require the measurement to be made by a PRU within a threshold distance of the UE 910 and/or with less than a threshold speed at the time of measurement, to be made within a threshold amount of time relative to a common measurement made by the UE 910, and/or to have less than a threshold measurement uncertainty. The measurement analysis apparatus 700 may ignore a measurement by giving the measurement a weight of zero. Imposing the threshold(s) may help ensure measurement accuracy and/or favoring of accurate/relevant measurements, which may improve the accuracy of a determined position of a target UE.

Referring also to FIGS. 10C and 10D, the measurement analysis apparatus 700 may be configured to transmit the measurement report 980 to the UE 910 indicating the selected measurement(s) and, if appropriate, weights for different measurements. For example, the measurement analysis apparatus 700 may indicate a sole selected measurement (e.g., selected based on measurement uncertainty, PRU spatial proximity to the UE 910, measurement temporal proximity to a reference signal measurement by the UE 910, PRU motion at the time of reference signal measurement, measurement quality based on residual, or a combination of two or more of these factors. An example measurement report 1060 includes a single entry, here the entry 1001, as determined by the measurement analysis apparatus 700. As another example, the measurement analysis apparatus 700 may select multiple measurements (e.g., based on one or more of the factors discussed) and indicate these measurements and corresponding weights for the UE 910 to apply to the measurements to determine a position estimate for the UE 910. An example measurement report 1070 includes entries 1071, 1072 (here corresponding to entries 1001, 1051) along with a weight(s) field 1080 that indicates one or more weights, e.g., one or more weights corresponding to one or more of the factors (e.g., measurement uncertainty, PRU spatial proximity, measurement temporal proximity, PRU speed, etc.) upon which one or more weights may be determined. The weight field 1080 may also or alternatively include an overall weight of each entry (e.g., based on two or more factors for determining weighting). The weight(s) field may indicate which factor each weight corresponds to, or that a weight is an overall weight. The UE 500, e.g., the positioning unit 550, may use the reference signal measurements and the weights to determine a position of the UE 500, e.g., using one or more known techniques such as differential measurement (e.g., TDOA).

The UE 500, e.g., the UE 810 or the UE 910, may transition from determining a position of the UE 500 based on a measurement provided by one PRU to determining a position of the UE 500 based on a measurement provided by another PRU by accounting for position drift due to the change in PRUs. For example, the positioning unit 550 may use a measurement taken by a first PRU, PRU1, at a time T to determine a first position solution, $P_{PRU1}(T)$. The positioning unit 550 may use a measurement taken by a second PRU, PRU2, at (or sufficiently near to) the time T to determine a second position solution, $P_{PRU2}(T)$. The positioning unit 550 may determine a leveling offset (a positioning drift) $P_{offset}$ according to $$P_{offset} = P_{PRU1}(T) - P_{PRU2}(T) \tag{3}$$

The positioning unit 550 may use the leveling offset to adjust future positions determined using measurements from the second PRU according to $$P(t) = P_{PRU2}(t) + P_{offset} \tag{4}$$

where P(t) is the position of the UE 500, and $P_{PRU2}(t)$ is the position of the UE 500 determined based on a measurement from the second PRU at a time t, where t is after time T. The UE 500 may adjust for the positioning drift where the UE 500 determines the position of the UE 500 based on measurement from a single PRU. The UE 500 may adjust for the positioning drift for any PRU that was swapped for another PRU where the UE 500 determines the position of the UE 500 based on measurements from multiple PRUs. Adjusting for positioning drift may help improve/maintain positioning accuracy for the target UE. Adjusting for positioning drift may facilitate positioning where different PRUs provide locations in different coordinate systems.

Figure 11:
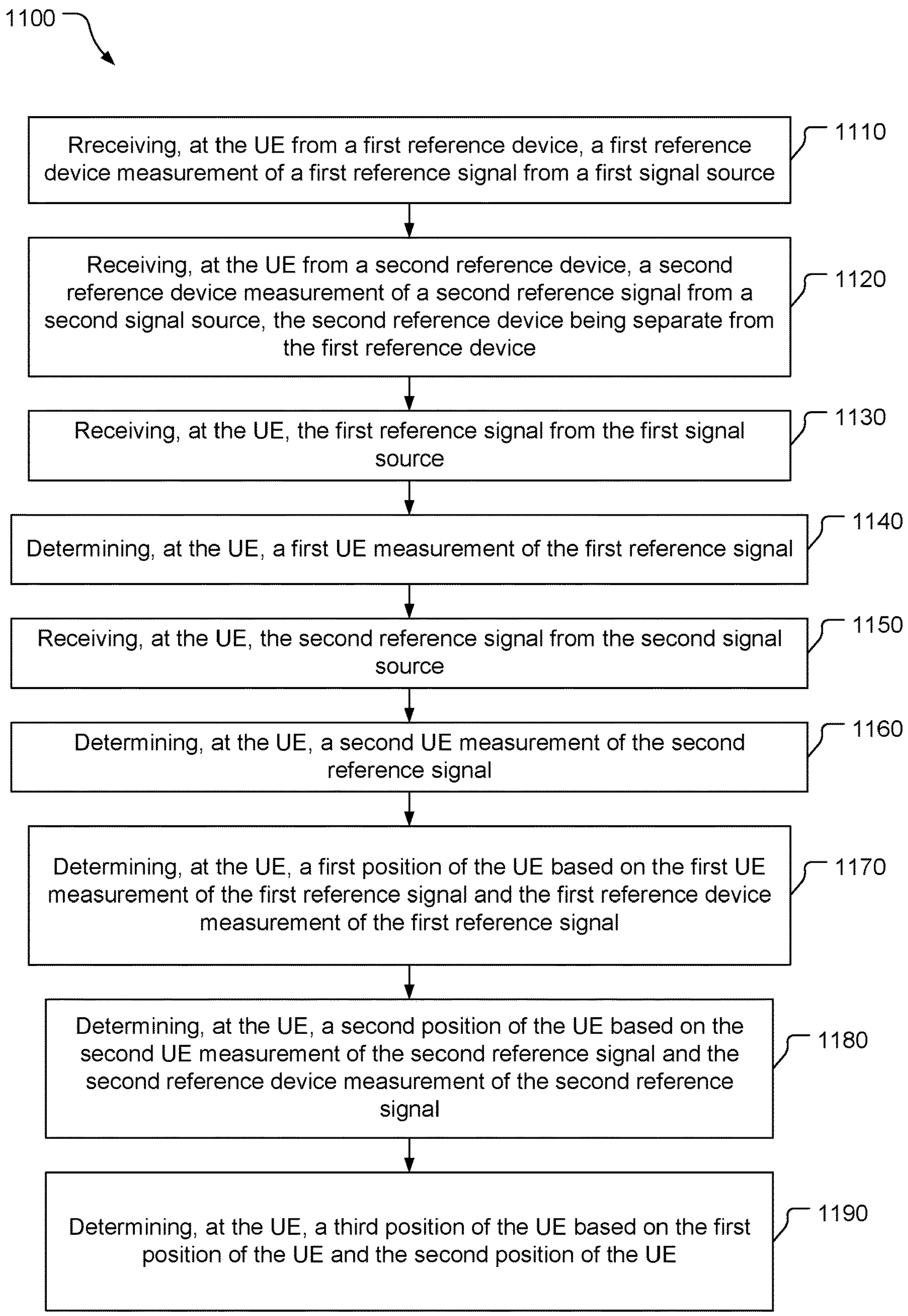
FIG. 11 is a flow diagram block of a user equipment positioning method.

Referring to FIG. 11, with further reference to FIGS. 1-10, a UE positioning method 1100 includes the stages shown. The method 1100 is, however, an example only and not limiting. The method 1100 may be altered, e.g., by having one or more stages added, removed, rearranged, combined, performed concurrently, and/or by having one or more single stages split into multiple stages.

At stage 1110, the method 1100 includes receiving, at the UE from a first reference device, a first reference device measurement of a first reference signal from a first signal source. For example, the UE 810 may receive a reference signal measurement in the measurement report 862, e.g., in the report 1000. The first reference device measurement may, for example, be of any of the reference signals 821, 831, 841. The processor 510, possibly in combination with the memory 530, in combination with a receiver of the transceiver 520, e.g., the wireless receiver 244 and the antenna 246, may comprise means for receiving the first reference device measurement.

At stage 1120, the method 1100 includes receiving, at the UE from a second reference device, a second reference device measurement of a second reference signal from a second signal source, the second reference device being separate from the first reference device. For example, the UE 810 may receive a reference signal measurement in the measurement report 872, e.g., in the report 1050. The second reference device measurement may, for example, be of any of the reference signals 833, 843, 852. The processor 510, possibly in combination with the memory 530, in combination with a receiver of the transceiver 520, e.g., the wireless receiver 244 and the antenna 246, may comprise means for receiving the second reference device measurement.

At stage 1130, the method 1100 includes receiving, at the UE, the first reference signal from the first signal source. For example, the UE 810 receives any of the reference signals 822, 832, 842 from any of the RSSes 811, 812, 813 corresponding to the source of the first reference signal. The processor 510, possibly in combination with the memory 530, in combination with a receiver of the transceiver 520, e.g., the wireless receiver 244 and the antenna 246, may comprise means for receiving the first reference signal.

At stage 1140, the method 1100 includes determining, at the UE, a first UE measurement of the first reference signal. For example, the positioning unit 550 measures the reference signal received by the UE 810 at stage 1130. The processor 510, possibly in combination with the memory 530, may comprise means for determining the first UE measurement.

At stage 1150, the method 1100 includes receiving, at the UE, the second reference signal from the second signal source. For example, the UE 810 receives any of the reference signals 832, 842, 851 from any of the RSSes 812, 813, 814 corresponding to the source of the second reference signal. The processor 510, possibly in combination with the memory 530, in combination with a receiver of the transceiver 520, e.g., the wireless receiver 244 and the antenna 246, may comprise means for receiving the second reference signal.

At stage 1160, the method 1100 includes determining, at the UE, a second UE measurement of the second reference signal. For example, the positioning unit 550 measures the reference signal received by the UE 810 at stage 1150. The processor 510, possibly in combination with the memory 530, may comprise means for determining the second UE measurement.

At stage 1170, the method 1100 includes determining, at the UE, a first position of the UE based on the first UE measurement of the first reference signal and the first reference device measurement of the first reference signal. For example, the positioning unit 550 determines a position estimate of the UE 810 (e.g., using RSTD) using the measurements of the reference signals 821, 822. The processor 510, possibly in combination with the memory 530, may comprise means for determining the first position of the UE.

At stage 1180, the method 1100 includes determining, at the UE, a second position of the UE based on the second UE measurement of the second reference signal and the second reference device measurement of the second reference signal. For example, the positioning unit 550 determines a position estimate of the UE 810 (e.g., using RSTD) based on the measurements of the reference signals 851, 852. The processor 510, possibly in combination with the memory 530, may comprise means for determining the second position of the UE.

At stage 1190, the method 1100 includes determining, at the UE, a third position of the UE based on the first position of the UE and the second position of the UE. For example, the positioning unit 550 may use Equation (1) to determine a weighted average position estimate using the first position of the UE and the second position of the UE. The processor 510, possibly in combination with the memory 530, may comprise means for determining the third position of the UE.

Implementations of the method 1100 may include one or more of the following features. In an example implementation, determining the third position of the UE comprises: determining a first position uncertainty of the first position of the UE; determining a second position uncertainty of the second position of the UE; and determining a weighted combination of the first position of the UE and the second position of the UE, based on the first position uncertainty and the second position uncertainty, as the third position of the UE. For example, the positioning unit 550 may determine position uncertainties (e.g., based on measurement uncertainties, uncertainties of positions of the RSSes, etc.) for the first and second positions of the UE and may use Equation (1) to determine a weighted average position estimate using the first position of the UE and the second position of the UE, and the corresponding uncertainties. The processor 510, possibly in combination with the memory 530, may comprise means for determining the first and second position uncertainties and means for determining the weighted combination of the first position of the UE and the second position of the UE. In another example implementation, the first signal source is the second signal source. For example, the PRUs 860, 870 may measure reference signals from the same RSS, e.g., the RSS 812. In another example implementation, the first signal source is separate from the second signal source. For example, the PRUs 860, 870 may measure reference signals from different RSSes, e.g., the RSS 811 and the RSS 814.

Also or alternatively, implementations of the method 1100 may include one or more of the following features. In an example implementation, the method 1100 further includes: receiving, at the UE from the first reference device, a first plurality of measurements of a first plurality of reference signals from a first plurality of signal sources, the first plurality of measurements including the first reference device measurement and the first plurality of signal sources including the first signal source; receiving, at the UE from the second reference device, a second plurality of measurements of a second plurality of reference signals from a second plurality of signal sources, the second plurality of measurements including the second reference device measurement and the second plurality of signal sources including the second signal source, the first plurality of signal sources including a first particular signal source not included in the second plurality of signal sources and the second plurality of signal sources including a second particular signal source not included in the first plurality of signal sources; receiving, at the UE, the first plurality of reference signals and the second plurality of reference signals; determining, at the UE, a first plurality of UE measurements of the first plurality of reference signals, the first plurality of UE measurements including the first UE measurement; determining, at the UE, a second plurality of UE measurements of the second plurality of reference signals, the second plurality of UE measurements including the second UE measurement; determining, at the UE, the first position of the UE based on the first plurality of UE measurements; and determining, at the UE, the second position of the UE based on the second plurality of UE measurements. For example, the measurement report 862 may include multiple measurements corresponding to a first set of multiple RSSes and the measurement report 862 may include multiple measurements corresponding to a second set of multiple RSSes, with at least one RSS in each of the first and second sets not being in the other set. For example, as with the reports 1000, 1050, the RSS 811 may be in the first set but not the second set and the RSS 814 may be in the second set but not the first set. The processor 510, possibly in combination with the memory 530, in combination with a receiver of the transceiver 520, e.g., the wireless receiver 244 and the antenna 246, may comprise means for receiving the first plurality of measurements, means for receiving the second plurality of measurements, and means for receiving the first plurality of reference signals and the second plurality of reference signals. The processor 510, possibly in combination with the memory 530, may comprise means for determining the first plurality of UE measurements, means for determining the second plurality of UE measurements, means for determining the first position of the UE based on the first plurality of UE measurements, and means for determining the second position of the UE based on the second plurality of UE measurements.

Also or alternatively, implementations of the method 1100 may include one or more of the following features. In an example implementation, the method 1100 includes: receiving, at the UE, an indication of presence of a third reference device within communication range of the UE; and determining, at the UE before using a third reference device measurement from the third reference device to determine a fourth position of the UE based at least in part on the third reference device measurement, that a position of the third reference device provided by the third reference device is within a threshold accuracy. For example, the UE 810 may receive a measurement report from a "new" PRU that was not in communication with the UE 810 (immediately) before sending the measurement report. The UE 810, e.g., the positioning unit 550, may verify a reported location of the new PRU (e.g., comparing the reported location with one or more determinations (e.g., GNSS location, location determined by base stations, etc.) of the position of the new PRU) before using a measurement in the measurement report to determine a position estimate for the UE 810. The processor 510, possibly in combination with the memory 530, in combination with a receiver of the transceiver 520, e.g., the wireless receiver 244 and the antenna 246, may comprise means for receiving the indication of presence of a third reference device. The processor 510, possibly in combination with the memory 530, possibly in combination with a receiver of the transceiver 520, e.g., the wireless receiver 244 and the antenna 246, may comprise means for determining that a position of the third reference device provided by the third reference device is within a threshold accuracy.

Also or alternatively, implementations of the method 1100 may include one or more of the following features. In an example implementation, determining the first position of the UE comprises: receiving, at the UE, a fourth reference device measurement from the first reference device; determining, at the UE, a fourth position of the UE based on the fourth reference device measurement; receiving, at the UE, a fifth reference device measurement from a third reference device; determining, at the UE, a fifth position of the UE based on the fifth reference device measurement; and determining, at the UE, the first position of the UE based on the first UE measurement of the first reference signal, the first reference device measurement of the first reference signal, and a difference between the fourth position of the UE and the fifth position of the UE. For example, the positioning unit 550 may determine the leveling offset according to Equation (3) based on the positions of the UE 500 determined based on measurements at or near the same time by different PRUs, one of which the UE 500 swaps from and the other of which the UE 500 is swaps to. The positioning unit 550 may use the leveling offset in Equation (4) to determine the position of the UE 500 at a later time by adjusting the position of the UE 500 determined using a measurement from the PRU that the UE 500 swapped to. The processor 510, possibly in combination with the memory 530, in combination with a receiver of the transceiver 520, e.g., the wireless receiver 244 and the antenna 246, may comprise means for receiving the fourth reference device measurement and means for receiving the fifth reference device measurement. The processor 510, possibly in combination with the memory 530, may comprise means for determining the fourth position of the UE, means for determining the fifth position of the UE, and means for the first position of the UE based on the first UE measurement of the first reference signal, the first reference device measurement of the first reference signal, and the difference between the fourth position of the UE and the fifth position of the UE.

Figure 12:
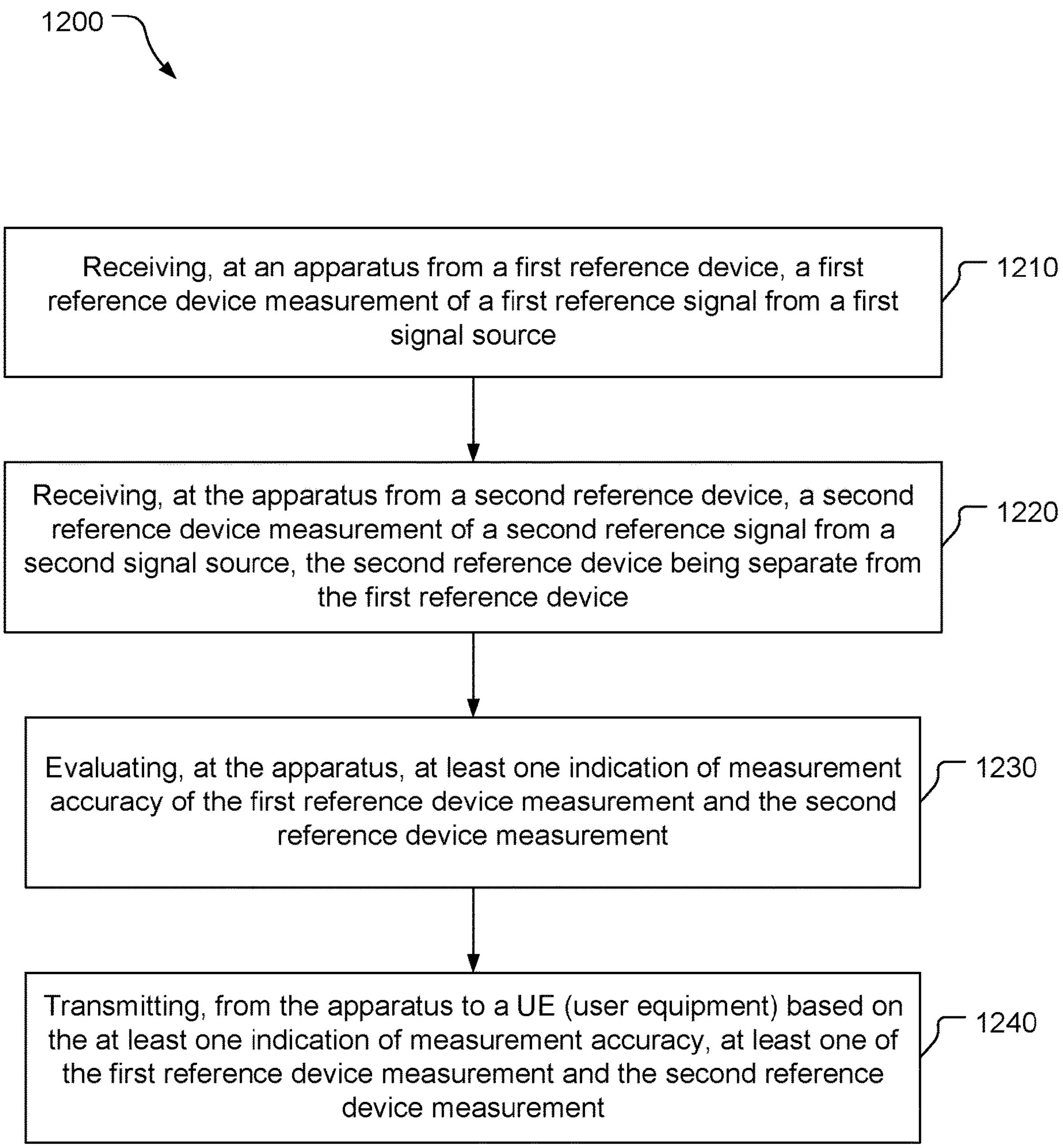
FIG. 12 is a flow diagram block of reference signal measurement analysis method.

Referring to FIG. 12, with further reference to FIGS. 1-10, a reference signal measurement analysis method 1200 includes the stages shown. The method 1200 is, however, an example only and not limiting. The method 1200 may be altered, e.g., by having one or more stages added, removed, rearranged, combined, performed concurrently, and/or by having one or more single stages split into multiple stages.

At stage 1210, the method 1200 includes receiving, at an apparatus from a first reference device, a first reference device measurement of a first reference signal from a first signal source. For example, the apparatus 700 may receive a reference signal measurement in the measurement report 962, e.g., in the report 1000. The first reference device measurement may, for example, be of any of the reference signals 821, 831, 841. The processor 710, possibly in combination with the memory 730, in combination with a receiver of the transceiver 720, e.g., the wireless receiver 244 and the antenna 246, or the wireless receiver 344 and the antenna 346, or the wireless receiver 444 and the antenna 446, or the wired receiver 354, or the wired receiver 454, may comprise means for receiving the first reference device measurement.

At stage 1220, the method 1200 includes receiving, at the apparatus from a second reference device, a second reference device measurement of a second reference signal from a second signal source, the second reference device being separate from the first reference device. For example, the apparatus 700 may receive a reference signal measurement in the measurement report 972, e.g., in the report 1050. The second reference device measurement may, for example, be of any of the reference signals 833, 843, 852. The processor 710, possibly in combination with the memory 730, in combination with a receiver of the transceiver 720, e.g., the wireless receiver 244 and the antenna 246, or the wireless receiver 344 and the antenna 346, or the wireless receiver 444 and the antenna 446, or the wired receiver 354, or the wired receiver 454, may comprise means for receiving the second reference device measurement.

At stage 1230, the method 1200 includes evaluating, at the apparatus, at least one indication of measurement accuracy of the first reference device measurement and the second reference device measurement. For example, the measurement analysis unit 750 may analyze measurement uncertainty, PRU mobility, PRU speed at time of measurement, measurement time, etc., to determine measurement accuracy. The processor 710, possibly in combination with the memory 730, may comprise means for evaluating the at least one indication of measurement accuracy.

At stage 1240, the method 1200 includes transmitting, from the apparatus to a UE (user equipment) based on the at least one indication of measurement accuracy, at least one of the first reference device measurement and the second reference device measurement. For example, the apparatus 700 may transmit the measurement report 980 (e.g., the report 1060 or the report 1070) to the UE 910. The processor 710, possibly in combination with the memory 730, in combination with a transmitter of the transceiver 720, e.g., the wireless transmitter 242 and the antenna 246, or the wireless transmitter 342 and the antenna 346, or the wireless transmitter 442 and the antenna 446, may comprise means for transmitting at least one of the first reference device measurement and the second reference device measurement.

Implementations of the method 1200 may include one or more of the following features. In an example implementation, transmitting the at least one of the first reference device measurement and the second reference device measurement comprises transmitting the first reference device measurement and the second reference device measurement in combination with at least one weighting indication, of a weighting of the first reference device measurement relative to the second reference device measurement, based on the at least one indication of measurement accuracy. For example, the apparatus 700 may transmit the measurement report 1070 with the weight(s) field 1080 indicating a weighting of one measurement (e.g., in the entry 1071) relative to another measurement (e.g., in the entry 1072). In a further example implementation, the method 1200 includes determining, at the apparatus, the at least one weighting indication based on a first measurement uncertainty of the first reference device measurement relative to a second measurement uncertainty of the second reference device measurement. In another further example implementation, the method 1200 includes determining, at the apparatus, the at least one weighting indication based on a first proximity, of the first reference device to the UE, relative to a second proximity, of the second reference device to the UE. In another further example implementation, the method 1200 includes determining, at the apparatus, the at least one weighting indication based on a first motion amount, of the first reference device, relative to a second motion amount, of the second reference device. In another further example implementation, the method 1200 includes determining, at the apparatus, the at least one weighting indication based on a first measurement time, of the first reference device measurement relative to a reference time, relative to a second measurement time, of the second reference device measurement relative to the reference time. In another further example implementation, the method 1200 includes determining, at the apparatus, the at least one weighting indication based on a first residual, of the first reference device measurement relative to a first benchmark reference device measurement of the first reference signal by a benchmark reference device, relative to a second residual, of the second reference device measurement relative to a second benchmark reference device measurement by the benchmark reference device of the second reference signal. For example, the measurement analysis unit 750 may evaluate measurement uncertainties, e.g., in the field 1013, and/or PRU proximities to the UE, and/or speed of PRUs at times of measurements of reference signals, and/or times of measurements of reference signals by PRUs relative to a reference time (e.g., a time of reference signal measurement by the UE or a present time), and/or a residual of measurements made by a PRU and a benchmark device (e.g., a benchmark PRU) to determine weights of measurements made by the PRUs 860, 870. The processor 710, possibly in combination with the memory 730, may comprise means for determining the at least one weighting indication.

Also or alternatively, implementations of the method 1200 may include one or more of the following features. In an example implementation, transmitting the at least one of the first reference device measurement and the second reference device measurement comprises transmitting only that reference device measurement, of the first reference device measurement and the second reference device measurement, that: (1) has a lower measurement uncertainty; or (2) corresponds to a closer one of the first reference device and the second reference device to the UE: or (3) corresponds to a less in-motion one of the first reference device and the second reference device; or (4) has a measurement time closer in time to a reference time; or (5) has a lower residual relative to a benchmark reference device measurement of the first reference signal or the second reference signal, respectively; or (6) any combination of two or more of (1)-(5). For example, the measurement analysis unit 750 may transmit a single measurement based on determining that that measurement is a best measurement based on evaluating measurement uncertainties, PRU proximities, PRU motion at time of measurement, PRU measurement times relative to a reference time, residuals relative to a benchmark device measurement, or any combination of two or more of these factors. The processor 710, possibly in combination with the memory 730, in combination with a transmitter of the transceiver 720, e.g., the wireless transmitter 242 and the antenna 246, or the wireless transmitter 342 and the antenna 346, or the wireless transmitter 442 and the antenna 446, may comprise means for transmitting at least one of the first reference device measurement and the second reference device measurement. In another example implementation, the method 1200 further includes: receiving, at the apparatus, an indication of presence of a third reference device within communication range of the UE; and determining, at the apparatus before transmitting a third reference device measurement from the third reference device to the UE, that a position of the third reference device provided by the third reference device is within a threshold accuracy. For example, the apparatus 700 may receive the measurement report 962 from the PRU 960, with which the apparatus 700 was not in communication (and take the measurement report as an indication of presence of the PRU 960). The apparatus 700 may decide to swap from another PRU to the PRU 960 for determining position of the UE 910, and may verify the location of the PRU 960 (e.g., by SPS location and/or communication with one or more other devices) before transmitting a measurement from the measurement report 962 to the UE 910. The processor 710, possibly in combination with the memory 730, in combination with a receiver of the transceiver 720, e.g., the wireless receiver 244 and the antenna 246, or the wireless receiver 344 and the antenna 346, or the wireless receiver 444 and the antenna 446, or the wired receiver 354, or the wired receiver 454, may comprise means for receiving the indication of presence of a third reference device and means for determining that a position of the third reference device provided by the third reference device is within a threshold accuracy.

IMPLEMENTATION EXAMPLES

Implementation examples are provided in the following numbered clauses.

Clause 1. A UE (user equipment) comprising:

at least one memory;

at least one receiver; and at least one processor, communicatively coupled to the at least one memory and the at least one receiver, configured to:

receive, via the at least one receiver from a first reference device, a first reference device measurement of a first reference signal from a first signal source;

receive, via the at least one receiver from a second reference device, a second reference device measurement of a second reference signal from a second signal source, the second reference device being separate from the first reference device;

receive, via the at least one receiver, the first reference signal from the first signal source;

determine a first UE measurement of the first reference signal;

receive, via the at least one receiver, the second reference signal from the second signal source;

determine a second UE measurement of the second reference signal;

determine a first position of the UE based on the first UE measurement of the first reference signal and the first reference device measurement of the first reference signal;

determine a second position of the UE based on the second UE measurement of the second reference signal and the second reference device measurement of the second reference signal; and determine a third position of the UE based on the first position of the UE and the second position of the UE.

Clause 2. The UE of clause 1, wherein to determine the third position of the UE the at least one processor is configured to:

determine a first position uncertainty of the first position of the UE;

determine a second position uncertainty of the second position of the UE; and determine a weighted combination of the first position of the UE and the second position of the UE, based on the first position uncertainty and the second position uncertainty, as the third position of the UE.

Clause 3. The UE of clause 1, wherein the first signal source is the second signal source.

Clause 4. The UE of clause 1, wherein the first signal source is separate from the second signal source.

Clause 5. The UE of clause 1, wherein the at least one processor is configured to:

receive, via the at least one receiver from the first reference device, a first plurality of measurements of a first plurality of reference signals from a first plurality of signal sources, the first plurality of measurements including the first reference device measurement and the first plurality of signal sources including the first signal source;

receive, via the at least one receiver from the second reference device, a second plurality of measurements of a second plurality of reference signals from a second plurality of signal sources, the second plurality of measurements including the second reference device measurement and the second plurality of signal sources including the second signal source, the first plurality of signal sources including a first particular signal source not included in the second plurality of signal sources and the second plurality of signal sources including a second particular signal source not included in the first plurality of signal sources;

receive, via the at least one receiver, the first plurality of reference signals and the second plurality of reference signals;

determine a first plurality of UE measurements of the first plurality of reference signals, the first plurality of UE measurements including the first UE measurement;

determine a second plurality of UE measurements of the second plurality of reference signals, the second plurality of UE measurements including the second UE measurement;

determine the first position of the UE based on the first plurality of UE measurements; and determine the second position of the UE based on the second plurality of UE measurements.

Clause 6. The UE of clause 1, wherein the at least one processor is configured to:

receive, via the at least one receiver, an indication of presence of a third reference device within communication range of the UE; and determine, before using a third reference device measurement from the third reference device to determine a fourth position of the UE based at least in part on the third reference device measurement, that a position of the third reference device provided by the third reference device is within a threshold accuracy.

Clause 7. The UE of clause 1, wherein to determine the first position of the UE, the at least one processor is configured to:

receive a fourth reference device measurement via the at least one receiver from the first reference device;

determine a fourth position of the UE based on the fourth reference device measurement;

receive a fifth reference device measurement via the at least one receiver from a third reference device;

determine a fifth position of the UE based on the fifth reference device measurement; and determine the first position of the UE based on the first UE measurement of the first reference signal, the first reference device measurement of the first reference signal, and a difference between the fourth position of the UE and the fifth position of the UE.

Clause 8. A UE (user equipment) positioning method comprising:

receiving, at the UE from a first reference device, a first reference device measurement of a first reference signal from a first signal source;

receiving, at the UE from a second reference device, a second reference device measurement of a second reference signal from a second signal source, the second reference device being separate from the first reference device;

receiving, at the UE, the first reference signal from the first signal source;

determining, at the UE, a first UE measurement of the first reference signal;

receiving, at the UE, the second reference signal from the second signal source;

determining, at the UE, a second UE measurement of the second reference signal;

determining, at the UE, a first position of the UE based on the first UE measurement of the first reference signal and the first reference device measurement of the first reference signal;

determining, at the UE, a second position of the UE based on the second UE measurement of the second reference signal and the second reference device measurement of the second reference signal; and determining, at the UE, a third position of the UE based on the first position of the UE and the second position of the UE.

Clause 9. The UE positioning method of clause 8, wherein determining the third position of the UE comprises:

determining a first position uncertainty of the first position of the UE;

determining a second position uncertainty of the second position of the UE; and determining a weighted combination of the first position of the UE and the second position of the UE, based on the first position uncertainty and the second position uncertainty, as the third position of the UE.

Clause 10. The UE positioning method of clause 8, wherein the first signal source is the second signal source.

Clause 11. The UE positioning method of clause 8, wherein the first signal source is separate from the second signal source.

Clause 12. The UE positioning method of clause 8, further comprising:

receiving, at the UE from the first reference device, a first plurality of measurements of a first plurality of reference signals from a first plurality of signal sources, the first plurality of measurements including the first reference device measurement and the first plurality of signal sources including the first signal source;

receiving, at the UE from the second reference device, a second plurality of measurements of a second plurality of reference signals from a second plurality of signal sources, the second plurality of measurements including the second reference device measurement and the second plurality of signal sources including the second signal source, the first plurality of signal sources including a first particular signal source not included in the second plurality of signal sources and the second plurality of signal sources including a second particular signal source not included in the first plurality of signal sources;

receiving, at the UE, the first plurality of reference signals and the second plurality of reference signals;

determining, at the UE, a first plurality of UE measurements of the first plurality of reference signals, the first plurality of UE measurements including the first UE measurement;

determining, at the UE, a second plurality of UE measurements of the second plurality of reference signals, the second plurality of UE measurements including the second UE measurement;

determining, at the UE, the first position of the UE based on the first plurality of UE measurements; and determining, at the UE, the second position of the UE based on the second plurality of UE measurements.

Clause 13. The UE positioning method of clause 8, further comprising:

receiving, at the UE, an indication of presence of a third reference device within communication range of the UE; and determining, at the UE before using a third reference device measurement from the third reference device to determine a fourth position of the UE based at least in part on the third reference device measurement, that a position of the third reference device provided by the third reference device is within a threshold accuracy.

Clause 14. The UE positioning method of clause 8, wherein determining the first position of the UE comprises:

receiving, at the UE, a fourth reference device measurement from the first reference device;

determining, at the UE, a fourth position of the UE based on the fourth reference device measurement;

receiving, at the UE, a fifth reference device measurement from a third reference device;

determining, at the UE, a fifth position of the UE based on the fifth reference device measurement; and determining, at the UE, the first position of the UE based on the first UE measurement of the first reference signal, the first reference device measurement of the first reference signal, and a difference between the fourth position of the UE and the fifth position of the UE.

Clause 15. A UE (user equipment) comprising:

means for receiving, from a first reference device, a first reference device measurement of a first reference signal from a first signal source;

means for receiving, from a second reference device, a second reference device measurement of a second reference signal from a second signal source, the second reference device being separate from the first reference device;

means for receiving the first reference signal from the first signal source;

means for determining a first UE measurement of the first reference signal;

means for receiving the second reference signal from the second signal source;

means for determining a second UE measurement of the second reference signal;

means for determining a first position of the UE based on the first UE measurement of the first reference signal and the first reference device measurement of the first reference signal;

means for determining a second position of the UE based on the second UE measurement of the second reference signal and the second reference device measurement of the second reference signal; and means for determining a third position of the UE based on the first position of the UE and the second position of the UE.

Clause 16. The UE of clause 15, wherein the means for determining the third position of the UE comprise:

means for determining a first position uncertainty of the first position of the UE;

means for determining a second position uncertainty of the second position of the UE; and means for determining a weighted combination of the first position of the UE and the second position of the UE, based on the first position uncertainty and the second position uncertainty, as the third position of the UE.

Clause 17. The UE of clause 15, wherein the first signal source is the second signal source.

Clause 18. The UE of clause 15, wherein the first signal source is separate from the second signal source.

Clause 19. The UE of clause 15, further comprising:

means for receiving, from the first reference device, a first plurality of measurements of a first plurality of reference signals from a first plurality of signal sources, the first plurality of measurements including the first reference device measurement and the first plurality of signal sources including the first signal source;

means for receiving, from the second reference device, a second plurality of measurements of a second plurality of reference signals from a second plurality of signal sources, the second plurality of measurements including the second reference device measurement and the second plurality of signal sources including the second signal source, the first plurality of signal sources including a first particular signal source not included in the second plurality of signal sources and the second plurality of signal sources including a second particular signal source not included in the first plurality of signal sources;

means for receiving the first plurality of reference signals and the second plurality of reference signals;

means for determining a first plurality of UE measurements of the first plurality of reference signals, the first plurality of UE measurements including the first UE measurement;

means for determining a second plurality of UE measurements of the second plurality of reference signals, the second plurality of UE measurements including the second UE measurement;

means for determining the first position of the UE based on the first plurality of UE measurements; and means for determining the second position of the UE based on the second plurality of UE measurements.

Clause 20. The UE of clause 15, further comprising:

means for receiving an indication of presence of a third reference device within communication range of the UE; and means for determining, before using a third reference device measurement from the third reference device to determine a fourth position of the UE based at least in part on the third reference device measurement, that a position of the third reference device provided by the third reference device is within a threshold accuracy.

Clause 21. The UE of clause 15, wherein the means for determining the first position of the UE comprise:

means for receiving a fourth reference device measurement from the first reference device;

means for determining a fourth position of the UE based on the fourth reference device measurement;

means for receiving a fifth reference device measurement from a third reference device;

means for determining a fifth position of the UE based on the fifth reference device measurement; and means for determining the first position of the UE based on the first UE measurement of the first reference signal, the first reference device measurement of the first reference signal, and a difference between the fourth position of the UE and the fifth position of the UE.

Clause 22. A non-transitory, processor-readable storage medium comprising processor-readable instructions to cause at least one processor of a UE (user equipment) to:

receive, from a first reference device, a first reference device measurement of a first reference signal from a first signal source;

receive, from a second reference device, a second reference device measurement of a second reference signal from a second signal source, the second reference device being separate from the first reference device;

receive the first reference signal from the first signal source;

determine a first UE measurement of the first reference signal;

receive the second reference signal from the second signal source;

determine a second UE measurement of the second reference signal;

determine a first position of the UE based on the first UE measurement of the first reference signal and the first reference device measurement of the first reference signal;

determine a second position of the UE based on the second UE measurement of the second reference signal and the second reference device measurement of the second reference signal; and determine a third position of the UE based on the first position of the UE and the second position of the UE.

Clause 23. The non-transitory, processor-readable storage medium of clause 22, wherein the processor-readable instructions to cause the at least one processor to determine the third position of the UE comprise processor-readable instructions to cause the at least one processor to:

determine a first position uncertainty of the first position of the UE;

determine a second position uncertainty of the second position of the UE; and determine a weighted combination of the first position of the UE and the second position of the UE, based on the first position uncertainty and the second position uncertainty, as the third position of the UE.

Clause 24. The non-transitory, processor-readable storage medium of clause 22, wherein the first signal source is the second signal source.

Clause 25. The non-transitory, processor-readable storage medium of clause 22, wherein the first signal source is separate from the second signal source.

Clause 26. The non-transitory, processor-readable storage medium of clause 22, further comprising processor-readable instructions to cause the at least one processor to:

receive, from the first reference device, a first plurality of measurements of a first plurality of reference signals from a first plurality of signal sources, the first plurality of measurements including the first reference device measurement and the first plurality of signal sources including the first signal source;

receive, from the second reference device, a second plurality of measurements of a second plurality of reference signals from a second plurality of signal sources, the second plurality of measurements including the second reference device measurement and the second plurality of signal sources including the second signal source, the first plurality of signal sources including a first particular signal source not included in the second plurality of signal sources and the second plurality of signal sources including a second particular signal source not included in the first plurality of signal sources;

receive the first plurality of reference signals and the second plurality of reference signals;

determine a first plurality of UE measurements of the first plurality of reference signals, the first plurality of UE measurements including the first UE measurement;

determine a second plurality of UE measurements of the second plurality of reference signals, the second plurality of UE measurements including the second UE measurement;

determine the first position of the UE based on the first plurality of UE measurements; and determine the second position of the UE based on the second plurality of UE measurements.

Clause 27. The non-transitory, processor-readable storage medium of clause 22, further comprising processor-readable instructions to cause the at least one processor to:

receive an indication of presence of a third reference device within communication range of the UE; and determine, before using a third reference device measurement from the third reference device to determine a fourth position of the UE based at least in part on the third reference device measurement, that a position of the third reference device provided by the third reference device is within a threshold accuracy.

Clause 28. The non-transitory, processor-readable storage medium of clause 22, wherein the processor-readable instructions to cause the at least one processor to determine the first position of the UE comprise processor-readable instructions to cause the at least one processor to:

receive a fourth reference device measurement from the first reference device;

determine a fourth position of the UE based on the fourth reference device measurement;

receive a fifth reference device measurement from a third reference device;

determine a fifth position of the UE based on the fifth reference device measurement; and determine the first position of the UE based on the first UE measurement of the first reference signal, the first reference device measurement of the first reference signal, and a difference between the fourth position of the UE and the fifth position of the UE.

Clause 29. An apparatus comprising:

at least one memory;

at least one transceiver; and at least one processor, communicatively coupled to the at least one memory and the at least one transceiver, configured to:

receive, via the at least one transceiver from a first reference device, a first reference device measurement of a first reference signal from a first signal source;

receive, via the at least one transceiver from a second reference device, a second reference device measurement of a second reference signal from a second signal source, the second reference device being separate from the first reference device;

evaluate at least one indication of measurement accuracy of the first reference device measurement and the second reference device measurement; and transmit, via the at least one transceiver to a UE (user equipment) based on the at least one indication of measurement accuracy, at least one of the first reference device measurement and the second reference device measurement.

Clause 30. The apparatus of clause 29, wherein the at least one processor is configured to transmit, via the at least one transceiver to the UE, the first reference device measurement and the second reference device measurement in combination with at least one weighting indication, of a weighting of the first reference device measurement relative to the second reference device measurement, based on the at least one indication of measurement accuracy.

Clause 31. The apparatus of clause 30, wherein the at least one processor is configured to determine the at least one weighting indication based on a first measurement uncertainty of the first reference device measurement relative to a second measurement uncertainty of the second reference device measurement.

Clause 32. The apparatus of clause 30, wherein the at least one processor is configured to determine the at least one weighting indication based on a first proximity, of the first reference device to the UE, relative to a second proximity, of the second reference device to the UE.

Clause 33. The apparatus of clause 30, wherein the at least one processor is configured to determine the at least one weighting indication based on a first motion amount, of the first reference device, relative to a second motion amount, of the second reference device.

Clause 34. The apparatus of clause 30, wherein the at least one processor is configured to determine the at least one weighting indication based on a first measurement time, of the first reference device measurement relative to a reference time, relative to a second measurement time, of the second reference device measurement relative to the reference time.

Clause 35. The apparatus of clause 30, wherein the at least one processor is configured to determine the at least one weighting indication based on a first residual, of the first reference device measurement relative to a first benchmark reference device measurement of the first reference signal by a benchmark reference device, relative to a second residual, of the second reference device measurement relative to a second benchmark reference device measurement by the benchmark reference device of the second reference signal.

Clause 36. The apparatus of clause 29, wherein the at least one processor is configured to transmit only that reference device measurement, of the first reference device measurement and the second reference device measurement, that: (1) has a lower measurement uncertainty; or (2) corresponds to a closer one of the first reference device and the second reference device to the UE: or (3) corresponds to a less in-motion one of the first reference device and the second reference device; or (4) has a measurement time closer in time to a reference time; or (5) has a lower residual relative to a benchmark reference device measurement of the first reference signal or the second reference signal, respectively; or (6) any combination of two or more of (1)-(5).

Clause 37. The apparatus of clause 29, wherein the at least one processor is configured to:

receive, via the at least one transceiver, an indication of presence of a third reference device within communication range of the UE; and determine, before transmitting a third reference device measurement from the third reference device to the UE, that a position of the third reference device provided by the third reference device is within a threshold accuracy.

Clause 38. A reference signal measurement analysis method comprising:

receiving, at an apparatus from a first reference device, a first reference device measurement of a first reference signal from a first signal source;

receiving, at the apparatus from a second reference device, a second reference device measurement of a second reference signal from a second signal source, the second reference device being separate from the first reference device;

evaluating, at the apparatus, at least one indication of measurement accuracy of the first reference device measurement and the second reference device measurement; and transmitting, from the apparatus to a UE (user equipment) based on the at least one indication of measurement accuracy, at least one of the first reference device measurement and the second reference device measurement.

Clause 39. The reference signal measurement analysis method of clause 38, wherein transmitting the at least one of the first reference device measurement and the second reference device measurement comprises transmitting the first reference device measurement and the second reference device measurement in combination with at least one weighting indication, of a weighting of the first reference device measurement relative to the second reference device measurement, based on the at least one indication of measurement accuracy.

Clause 40. The reference signal measurement analysis method of clause 39, further comprising determining, at the apparatus, the at least one weighting indication based on a first measurement uncertainty of the first reference device measurement relative to a second measurement uncertainty of the second reference device measurement.

Clause 41. The reference signal measurement analysis method of clause 39, further comprising determining, at the apparatus, the at least one weighting indication based on a first proximity, of the first reference device to the UE, relative to a second proximity, of the second reference device to the UE.

Clause 42. The reference signal measurement analysis method of clause 39, further comprising determining, at the apparatus, the at least one weighting indication based on a first motion amount, of the first reference device, relative to a second motion amount, of the second reference device.

Clause 43. The reference signal measurement analysis method of clause 39, further comprising determining, at the apparatus, the at least one weighting indication based on a first measurement time, of the first reference device measurement relative to a reference time, relative to a second measurement time, of the second reference device measurement relative to the reference time.

Clause 44. The reference signal measurement analysis method of clause 39, further comprising determining, at the apparatus, the at least one weighting indication based on a first residual, of the first reference device measurement relative to a first benchmark reference device measurement of the first reference signal by a benchmark reference device, relative to a second residual, of the second reference device measurement relative to a second benchmark reference device measurement by the benchmark reference device of the second reference signal.

Clause 45. The reference signal measurement analysis method of clause 38, wherein transmitting the at least one of the first reference device measurement and the second reference device measurement comprises transmitting only that reference device measurement, of the first reference device measurement and the second reference device measurement, that: (1) has a lower measurement uncertainty; or (2) corresponds to a closer one of the first reference device and the second reference device to the UE: or (3) corresponds to a less in-motion one of the first reference device and the second reference device; or (4) has a measurement time closer in time to a reference time; or (5) has a lower residual relative to a benchmark reference device measurement of the first reference signal or the second reference signal, respectively; or (6) any combination of two or more of (1)-(5).

Clause 46. The reference signal measurement analysis method of clause 38, further comprising:

receiving, at the apparatus, an indication of presence of a third reference device within communication range of the UE; and determining, at the apparatus before transmitting a third reference device measurement from the third reference device to the UE, that a position of the third reference device provided by the third reference device is within a threshold accuracy.

Clause 47. An apparatus comprising:

means for receiving, from a first reference device, a first reference device measurement of a first reference signal from a first signal source;

means for receiving, from a second reference device, a second reference device measurement of a second reference signal from a second signal source, the second reference device being separate from the first reference device;

means for evaluating at least one indication of measurement accuracy of the first reference device measurement and the second reference device measurement; and means for transmitting, to a UE (user equipment) based on the at least one indication of measurement accuracy, at least one of the first reference device measurement and the second reference device measurement.

Clause 48. The apparatus of clause 47, wherein the means for transmitting the at least one of the first reference device measurement and the second reference device measurement comprise means for transmitting the first reference device measurement and the second reference device measurement in combination with at least one weighting indication, of a weighting of the first reference device measurement relative to the second reference device measurement, based on the at least one indication of measurement accuracy.

Clause 49. The apparatus of clause 48, further comprising means for determining the at least one weighting indication based on a first measurement uncertainty of the first reference device measurement relative to a second measurement uncertainty of the second reference device measurement.

Clause 50. The apparatus of clause 48, further comprising means for determining the at least one weighting indication based on a first proximity, of the first reference device to the UE, relative to a second proximity, of the second reference device to the UE.

Clause 51. The apparatus of clause 48, further comprising means for determining the at least one weighting indication based on a first motion amount, of the first reference device, relative to a second motion amount, of the second reference device.

Clause 52. The apparatus of clause 48, further comprising means for determining the at least one weighting indication based on a first measurement time, of the first reference device measurement relative to a reference time, relative to a second measurement time, of the second reference device measurement relative to the reference time.

Clause 53. The apparatus of clause 48, further comprising means for determining the at least one weighting indication based on a first residual, of the first reference device measurement relative to a first benchmark reference device measurement of the first reference signal by a benchmark reference device, relative to a second residual, of the second reference device measurement relative to a second benchmark reference device measurement by the benchmark reference device of the second reference signal.

Clause 54. The apparatus of clause 47, wherein the means for transmitting the at least one of the first reference device measurement and the second reference device measurement comprise means for transmitting only that reference device measurement, of the first reference device measurement and the second reference device measurement, that: (1) has a lower measurement uncertainty; or (2) corresponds to a closer one of the first reference device and the second reference device to the UE: or (3) corresponds to a less in-motion one of the first reference device and the second reference device; or (4) has a measurement time closer in time to a reference time; or (5) has a lower residual relative to a benchmark reference device measurement of the first reference signal or the second reference signal, respectively; or (6) any combination of two or more of (1)-(5).

Clause 55. The apparatus of clause 47, further comprising:

means for receiving an indication of presence of a third reference device within communication range of the UE; and means for determining, before transmitting a third reference device measurement from the third reference device to the UE, that a position of the third reference device provided by the third reference device is within a threshold accuracy.

Clause 56. A non-transitory, processor-readable medium comprising processor-readable instructions to cause at least one processor of an apparatus to:

receive, from a first reference device, a first reference device measurement of a first reference signal from a first signal source;

receive, from a second reference device, a second reference device measurement of a second reference signal from a second signal source, the second reference device being separate from the first reference device;

evaluate at least one indication of measurement accuracy of the first reference device measurement and the second reference device measurement; and transmit, to a UE (user equipment) based on the at least one indication of measurement accuracy, at least one of the first reference device measurement and the second reference device measurement.

Clause 57. The non-transitory, processor-readable medium of clause 56, wherein the processor-readable instructions to cause the at least one processor to transmit the at least one of the first reference device measurement and the second reference device measurement comprise processor-readable instructions to cause the at least one processor to transmit the first reference device measurement and the second reference device measurement in combination with at least one weighting indication, of a weighting of the first reference device measurement relative to the second reference device measurement, based on the at least one indication of measurement accuracy.

Clause 58. The non-transitory, processor-readable medium of clause 57, further comprising processor-readable instructions to cause the at least one processor to determine the at least one weighting indication based on a first measurement uncertainty of the first reference device measurement relative to a second measurement uncertainty of the second reference device measurement.

Clause 59. The non-transitory, processor-readable medium of clause 57, further comprising processor-readable instructions to cause the at least one processor to determine the at least one weighting indication based on a first proximity, of the first reference device to the UE, relative to a second proximity, of the second reference device to the UE.

Clause 60. The non-transitory, processor-readable medium of clause 57, further comprising processor-readable instructions to cause the at least one processor to determine the at least one weighting indication based on a first motion amount, of the first reference device, relative to a second motion amount, of the second reference device.

Clause 61. The non-transitory, processor-readable medium of clause 57, further comprising processor-readable instructions to cause the at least one processor to determine the at least one weighting indication based on a first measurement time, of the first reference device measurement relative to a reference time, relative to a second measurement time, of the second reference device measurement relative to the reference time.

Clause 62. The non-transitory, processor-readable medium of clause 57, further comprising processor-readable instructions to cause the at least one processor to determine the at least one weighting indication based on a first residual, of the first reference device measurement relative to a first benchmark reference device measurement of the first reference signal by a benchmark reference device, relative to a second residual, of the second reference device measurement relative to a second benchmark reference device measurement by the benchmark reference device of the second reference signal.

Clause 63. The non-transitory, processor-readable medium of clause 56, wherein the processor-readable instructions to cause the at least one processor to transmit the at least one of the first reference device measurement and the second reference device measurement comprise processor-readable instructions to cause the at least one processor to transmit only that reference device measurement, of the first reference device measurement and the second reference device measurement, that: (1) has a lower measurement uncertainty; or (2) corresponds to a closer one of the first reference device and the second reference device to the UE: or (3) corresponds to a less in-motion one of the first reference device and the second reference device; or (4) has a measurement time closer in time to a reference time; or (5) has a lower residual relative to a benchmark reference device measurement of the first reference signal or the second reference signal, respectively; or (6) any combination of two or more of (1)-(5).

Clause 64. The non-transitory, processor-readable medium of clause 56, further comprising processor-readable instructions to cause the at least one processor to:

receive an indication of presence of a third reference device within communication range of the UE; and determine, before transmitting a third reference device measurement from the third reference device to the UE, that a position of the third reference device provided by the third reference device is within a threshold accuracy.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of 20% or ±10%, +5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A UE (user equipment) comprising:

at least one memory;

at least one receiver; and at least one processor, communicatively coupled to the at least one memory and the at least one receiver, configured to:

receive, via the at least one receiver from a first reference device, a first reference device measurement of a first reference signal from a first signal source;

receive, via the at least one receiver from a second reference device, a second reference device measurement of a second reference signal from a second signal source, the second reference device being separate from the first reference device;

receive, via the at least one receiver, the first reference signal from the first signal source;

determine a first UE measurement of the first reference signal;

receive, via the at least one receiver, the second reference signal from the second signal source;

determine a second UE measurement of the second reference signal;

determine a first position of the UE based on the first UE measurement of the first reference signal and the first reference device measurement of the first reference signal;

determine a second position of the UE based on the second UE measurement of the second reference signal and the second reference device measurement of the second reference signal; and determine a third position of the UE based on the first position of the UE and the second position of the UE, wherein the third position of the UE is a weighted average position of the first position of the UE and the second position of the UE.

2. The UE of claim 1, wherein to determine the third position of the UE the at least one processor is configured to:

determine a first position uncertainty of the first position of the UE;

determine a second position uncertainty of the second position of the UE; and determine a weighted combination of the first position of the UE and the second position of the UE, based on the first position uncertainty and the second position uncertainty, as the third position of the UE.

3. The UE of claim 1, wherein the first signal source is the second signal source.

4. The UE of claim 1, wherein the first signal source is separate from the second signal source.

5. The UE of claim 1, wherein the at least one processor is configured to:

receive, via the at least one receiver from the first reference device, a first plurality of measurements of a first plurality of reference signals from a first plurality of signal sources, the first plurality of measurements including the first reference device measurement and the first plurality of signal sources including the first signal source;

receive, via the at least one receiver from the second reference device, a second plurality of measurements of a second plurality of reference signals from a second plurality of signal sources, the second plurality of measurements including the second reference device measurement and the second plurality of signal sources including the second signal source, the first plurality of signal sources including a first particular signal source not included in the second plurality of signal sources and the second plurality of signal sources including a second particular signal source not included in the first plurality of signal sources;

receive, via the at least one receiver, the first plurality of reference signals and the second plurality of reference signals;

determine a first plurality of UE measurements of the first plurality of reference signals, the first plurality of UE measurements including the first UE measurement;

determine a second plurality of UE measurements of the second plurality of reference signals, the second plurality of UE measurements including the second UE measurement;

determine the first position of the UE based on the first plurality of UE measurements; and determine the second position of the UE based on the second plurality of UE measurements.

6. The UE of claim 1, wherein the at least one processor is configured to:

receive, via the at least one receiver, an indication of presence of a third reference device within communication range of the UE; and determine, before using a third reference device measurement from the third reference device to determine a fourth position of the UE based at least in part on the third reference device measurement, that a position of the third reference device provided by the third reference device is within a threshold accuracy.

7. The UE of claim 1, wherein to determine the first position of the UE, the at least one processor is configured to:

receive a fourth reference device measurement via the at least one receiver from the first reference device;

determine a fourth position of the UE based on the fourth reference device measurement;

receive a fifth reference device measurement via the at least one receiver from a third reference device;

determine a fifth position of the UE based on the fifth reference device measurement; and determine the first position of the UE based on the first UE measurement of the first reference signal, the first reference device measurement of the first reference signal, and a difference between the fourth position of the UE and the fifth position of the UE.

8. A UE (user equipment) positioning method comprising:

receiving, at the UE from a first reference device, a first reference device measurement of a first reference signal from a first signal source;

receiving, at the UE from a second reference device, a second reference device measurement of a second reference signal from a second signal source, the second reference device being separate from the first reference device;

receiving, at the UE, the first reference signal from the first signal source;

determining, at the UE, a first UE measurement of the first reference signal;

receiving, at the UE, the second reference signal from the second signal source;

determining, at the UE, a second UE measurement of the second reference signal;

determining, at the UE, a first position of the UE based on the first UE measurement of the first reference signal and the first reference device measurement of the first reference signal;

determining, at the UE, a second position of the UE based on the second UE measurement of the second reference signal and the second reference device measurement of the second reference signal; and determining, at the UE, a third position of the UE based on the first position of the UE and the second position of the UE, wherein the third position of the UE is a weighted average position of the first position of the UE and the second position of the UE.

9. The UE positioning method of claim 8, wherein determining the third position of the UE comprises:

determining a first position uncertainty of the first position of the UE;

determining a second position uncertainty of the second position of the UE; and determining a weighted combination of the first position of the UE and the second position of the UE, based on the first position uncertainty and the second position uncertainty, as the third position of the UE.

10. The UE positioning method of claim 8, wherein the first signal source is the second signal source.

11. The UE positioning method of claim 8, wherein the first signal source is separate from the second signal source.

12. The UE positioning method of claim 8, further comprising:

receiving, at the UE from the first reference device, a first plurality of measurements of a first plurality of reference signals from a first plurality of signal sources, the first plurality of measurements including the first reference device measurement and the first plurality of signal sources including the first signal source;

receiving, at the UE from the second reference device, a second plurality of measurements of a second plurality of reference signals from a second plurality of signal sources, the second plurality of measurements including the second reference device measurement and the second plurality of signal sources including the second signal source, the first plurality of signal sources including a first particular signal source not included in the second plurality of signal sources and the second plurality of signal sources including a second particular signal source not included in the first plurality of signal sources;

receiving, at the UE, the first plurality of reference signals and the second plurality of reference signals;

determining, at the UE, a first plurality of UE measurements of the first plurality of reference signals, the first plurality of UE measurements including the first UE measurement;

determining, at the UE, a second plurality of UE measurements of the second plurality of reference signals, the second plurality of UE measurements including the second UE measurement;

determining, at the UE, the first position of the UE based on the first plurality of UE measurements; and determining, at the UE, the second position of the UE based on the second plurality of UE measurements.

13. The UE positioning method of claim 8, further comprising:

receiving, at the UE, an indication of presence of a third reference device within communication range of the UE; and determining, at the UE before using a third reference device measurement from the third reference device to determine a fourth position of the UE based at least in part on the third reference device measurement, that a position of the third reference device provided by the third reference device is within a threshold accuracy.

14. The UE positioning method of claim 8, wherein determining the first position of the UE comprises:

receiving, at the UE, a fourth reference device measurement from the first reference device;

determining, at the UE, a fourth position of the UE based on the fourth reference device measurement;

receiving, at the UE, a fifth reference device measurement from a third reference device;

determining, at the UE, a fifth position of the UE based on the fifth reference device measurement; and determining, at the UE, the first position of the UE based on the first UE measurement of the first reference signal, the first reference device measurement of the first reference signal, and a difference between the fourth position of the UE and the fifth position of the UE.

15. A UE (user equipment) comprising:

means for receiving, from a first reference device, a first reference device measurement of a first reference signal from a first signal source;

means for receiving, from a second reference device, a second reference device measurement of a second reference signal from a second signal source, the second reference device being separate from the first reference device;

means for receiving the first reference signal from the first signal source;

means for determining a first UE measurement of the first reference signal;

means for receiving the second reference signal from the second signal source;

means for determining a second UE measurement of the second reference signal;

means for determining a first position of the UE based on the first UE measurement of the first reference signal and the first reference device measurement of the first reference signal;

means for determining a second position of the UE based on the second UE measurement of the second reference signal and the second reference device measurement of the second reference signal; and means for determining a third position of the UE based on the first position of the UE and the second position of the UE, wherein the third position of the UE is a weighted average position of the first position of the UE and the second position of the UE.

16. The UE of claim 15, wherein the means for determining the third position of the UE comprise:

means for determining a first position uncertainty of the first position of the UE;

means for determining a second position uncertainty of the second position of the UE; and means for determining a weighted combination of the first position of the UE and the second position of the UE, based on the first position uncertainty and the second position uncertainty, as the third position of the UE.

17. The UE of claim 15, wherein the first signal source is the second signal source.

18. The UE of claim 15, wherein the first signal source is separate from the second signal source.

19. The UE of claim 15, further comprising:

means for receiving, from the first reference device, a first plurality of measurements of a first plurality of reference signals from a first plurality of signal sources, the first plurality of measurements including the first reference device measurement and the first plurality of signal sources including the first signal source;

means for receiving, from the second reference device, a second plurality of measurements of a second plurality of reference signals from a second plurality of signal sources, the second plurality of measurements including the second reference device measurement and the second plurality of signal sources including the second signal source, the first plurality of signal sources including a first particular signal source not included in the second plurality of signal sources and the second plurality of signal sources including a second particular signal source not included in the first plurality of signal sources;

means for receiving the first plurality of reference signals and the second plurality of reference signals;

means for determining a first plurality of UE measurements of the first plurality of reference signals, the first plurality of UE measurements including the first UE measurement;

means for determining a second plurality of UE measurements of the second plurality of reference signals, the second plurality of UE measurements including the second UE measurement;

means for determining the first position of the UE based on the first plurality of UE measurements; and means for determining the second position of the UE based on the second plurality of UE measurements.

20. The UE of claim 15, further comprising:

means for receiving an indication of presence of a third reference device within communication range of the UE; and means for determining, before using a third reference device measurement from the third reference device to determine a fourth position of the UE based at least in part on the third reference device measurement, that a position of the third reference device provided by the third reference device is within a threshold accuracy.

21. The UE of claim 15, wherein the means for determining the first position of the UE comprise:

means for receiving a fourth reference device measurement from the first reference device;

means for determining a fourth position of the UE based on the fourth reference device measurement;

means for receiving a fifth reference device measurement from a third reference device;

means for determining a fifth position of the UE based on the fifth reference device measurement; and means for determining the first position of the UE based on the first UE measurement of the first reference signal, the first reference device measurement of the first reference signal, and a difference between the fourth position of the UE and the fifth position of the UE.

22. A non-transitory, processor-readable storage medium comprising processor-readable instructions to cause at least one processor of a UE (user equipment) to:

receive, from a first reference device, a first reference device measurement of a first reference signal from a first signal source;

receive, from a second reference device, a second reference device measurement of a second reference signal from a second signal source, the second reference device being separate from the first reference device;

receive the first reference signal from the first signal source;

determine a first UE measurement of the first reference signal;

receive the second reference signal from the second signal source;

determine a second UE measurement of the second reference signal;

determine a first position of the UE based on the first UE measurement of the first reference signal and the first reference device measurement of the first reference signal;

determine a second position of the UE based on the second UE measurement of the second reference signal and the second reference device measurement of the second reference signal; and determine a third position of the UE based on the first position of the UE and the second position of the UE, wherein the third position of the UE is a weighted average position of the first position of the UE and the second position of the UE.

23. The non-transitory, processor-readable storage medium of claim 22, wherein the processor-readable instructions to cause the at least one processor to determine the third position of the UE comprise processor-readable instructions to cause the at least one processor to:

determine a first position uncertainty of the first position of the UE;

determine a second position uncertainty of the second position of the UE; and determine a weighted combination of the first position of the UE and the second position of the UE, based on the first position uncertainty and the second position uncertainty, as the third position of the UE.

24. The non-transitory, processor-readable storage medium of claim 22, wherein the first signal source is the second signal source.

25. The non-transitory, processor-readable storage medium of claim 22, wherein the first signal source is separate from the second signal source.

26. The non-transitory, processor-readable storage medium of claim 22, further comprising processor-readable instructions to cause the at least one processor to:

receive, from the first reference device, a first plurality of measurements of a first plurality of reference signals from a first plurality of signal sources, the first plurality of measurements including the first reference device measurement and the first plurality of signal sources including the first signal source;

receive, from the second reference device, a second plurality of measurements of a second plurality of reference signals from a second plurality of signal sources, the second plurality of measurements including the second reference device measurement and the second plurality of signal sources including the second signal source, the first plurality of signal sources including a first particular signal source not included in the second plurality of signal sources and the second plurality of signal sources including a second particular signal source not included in the first plurality of signal sources;

receive the first plurality of reference signals and the second plurality of reference signals;

determine a first plurality of UE measurements of the first plurality of reference signals, the first plurality of UE measurements including the first UE measurement;

determine a second plurality of UE measurements of the second plurality of reference signals, the second plurality of UE measurements including the second UE measurement;

determine the first position of the UE based on the first plurality of UE measurements; and determine the second position of the UE based on the second plurality of UE measurements.

27. The non-transitory, processor-readable storage medium of claim 22, further comprising processor-readable instructions to cause the at least one processor to:

receive an indication of presence of a third reference device within communication range of the UE; and determine, before using a third reference device measurement from the third reference device to determine a fourth position of the UE based at least in part on the third reference device measurement, that a position of the third reference device provided by the third reference device is within a threshold accuracy.

28. The non-transitory, processor-readable storage medium of claim 22, wherein the processor-readable instructions to cause the at least one processor to determine the first position of the UE comprise processor-readable instructions to cause the at least one processor to:

receive a fourth reference device measurement from the first reference device;
determine a fourth position of the UE based on the fourth reference device measurement;
receive a fifth reference device measurement from a third reference device;
determine a fifth position of the UE based on the fifth reference device measurement; and
determine the first position of the UE based on the first UE measurement of the first reference signal, the first reference device measurement of the first reference signal, and a difference between the fourth position of the UE and the fifth position of the UE.

* * * * *